United States Patent
Tang et al.

(10) Patent No.: US 8,089,698 B1
(45) Date of Patent: Jan. 3, 2012

(54) WIDE-ANGLE OPTICAL LENS ASSEMBLY

(75) Inventors: Hsiang-Chi Tang, Taichung (TW);
Tsung-Han Tsai, Taichung (TW);
Hsin-Hsuan Huang, Taichung (TW)

(73) Assignee: Largan Precision Co., Ltd., Taichung (TW)

(*) Notice: Subject to any disclaimer, the term of this patent is extended or adjusted under 35 U.S.C. 154(b) by 0 days.

(21) Appl. No.: 13/089,328

(22) Filed: Apr. 19, 2011

(30) Foreign Application Priority Data

Dec. 9, 2010 (TW) .............................. 99143038 A

(51) Int. Cl.
*G02B 25/00* (2006.01)
*G02B 13/04* (2006.01)
(52) U.S. Cl. ........ 359/644; 359/660; 359/740; 359/753; 359/771
(58) Field of Classification Search .................. 359/644, 359/660, 740, 753, 771
See application file for complete search history.

(56) References Cited

U.S. PATENT DOCUMENTS

| | | | | |
|---|---|---|---|---|
| 4,170,403 A | * | 10/1979 | Shimokura | 359/753 |
| 2005/0174463 A1 | * | 8/2005 | Ohzawa et al. | 348/335 |
| 2009/0073577 A1 | * | 3/2009 | Jung et al. | 359/717 |
| 2009/0251801 A1 | * | 10/2009 | Jung et al. | 359/708 |
| 2010/0259632 A1 | * | 10/2010 | Matsusaka et al. | 359/740 |

* cited by examiner

*Primary Examiner* — Evelyn A. Lester
(74) *Attorney, Agent, or Firm* — CKC & Partners Co., Ltd.

(57) ABSTRACT

A wide-angle optical lens assembly comprises, in order from an object side to an image side: a first lens element with a negative refractive power having concave image-side surface, a second lens element with a positive refractive power, a third lens element with a positive refractive power, and a fourth lens element with a positive refractive power having convex image-side surface, at least one surface of the fourth lens element thereof being aspheric. By such arrangement, total track length and photosensitivity of the wide-angle optical lens assembly can be effectively reduced while retaining large field of view and superb image quality.

22 Claims, 15 Drawing Sheets

WIDE-ANGLE OPTICAL LENS ASSEMBLY

RELATED APPLICATIONS

The application claims priority to Taiwan Application Serial Number 099143038, filed Dec. 9, 2010, which is herein incorporated by reference.

BACKGROUND

1. Technical Field

The present invention relates to a wide-angle optical lens assembly. More particularly, the present invention relates to a compact wide-angle optical lens assembly having a large view angle.

2. Description of Related Art

In recent years, with the popularity of mobile products with camera functionalities, the demand for compact photographing lenses is increasing, and the sensor of a conventional photographing camera is none other than CCD (Charge Coupled Device) or CMOS (Complementary Metal-Oxide Semiconductor Sensor). Furthermore, as advanced semiconductor manufacturing technology has allowed the pixel size of sensors to be reduced and compact photographing lenses have gradually evolved toward higher megapixels, there is an increasing demand for compact photographing lenses featuring better image quality.

The photographing lens assembly generally applied on vehicles, image monitoring and electronic entertainment devices requires a large view angle to consider capturing a large range of image features in one single shot. A conventional photographing lens assembly with a large view angle mostly a configuration structure in which a front lens group is with a negative refractive power and a rear lens group is with a positive refractive power, which is a so-called Inverse Telephoto structure, thereby obtaining a wide-angle characteristic. However, the rear lens group with a positive refractive power adopts a one-element lens structure so that the conventional photographing lens assembly fails to correct the aberration completely.

Moreover, with the popularity of vehicles with car back monitors, the demand for wide-angle lens assembly with high-pixel resolution becomes a trend. Therefore, there is a need existing in the art for providing a wide-angle lens assembly that features better image quality and a wide-angle characteristic, and also maintains a moderate total track length.

SUMMARY

The present invention provides a wide-angle optical lens assembly including, in order from an object side to an image side: a first lens element, a second lens element, a third lens element and a fourth lens element. The first lens element with a negative refractive power has a concave image-side surface. The second lens element is with a positive refractive power. The third lens element is with a positive refractive power. The fourth lens element with a positive refractive power has a convex image-side surface and is made of plastic material, wherein the fourth lens element has at least one aspheric surface. A radius of curvature of the image-side surface of the first lens element is R2, a radius of curvature of the object-side surface of the second lens element is R3, a radius of curvature of the image-side surface of the second lens element is R4, a thickness on the optical axis of the first lens element is CT1, a thickness on the optical axis of the fourth lens element is CT4, and they satisfy the following relationships:

$0.0 < R2/CT1 < 5.0;$ $-3.5 < (R3+R4)/(R3-R4) < 0.0;$ and $0.0 < CT4/CT1 < 1.5.$ According to another aspect of the present invention, a wide-angle optical lens assembly includes, in order from an object side to an image side: a first lens element, a second lens element, a third lens element and a fourth lens element. The first lens element with a negative refractive power has a concave image-side surface. The second lens element with a positive refractive power has a convex object-side surface. The fourth lens element with a positive refractive power has a convex image-side surface and is made of plastic material, wherein the fourth lens element has at least one aspheric surface. Wherein a radius of curvature of the image-side surface of the first lens element is R2, a thickness on the optical axis of the first lens element is CT1, a focal length of the wide-angle optical lens assembly is f, a focal length of the second lens element is f2, a distance on the optical axis between the first lens element and the second lens element is T12, a radius of curvature of the image-side surface of the third lens element is R6, a radius of curvature of the object-side surface of the fourth lens element is R7, and they satisfy the following relationships:

$0.0 < R2/CT1 < 2.0;$ $0.0 < f/f2 < 0.8;$ $0.8 < T12/f < 5.0;$ and $1.0 < |R6-R7|/f.$

DETAILED DESCRIPTION

Figure 1:
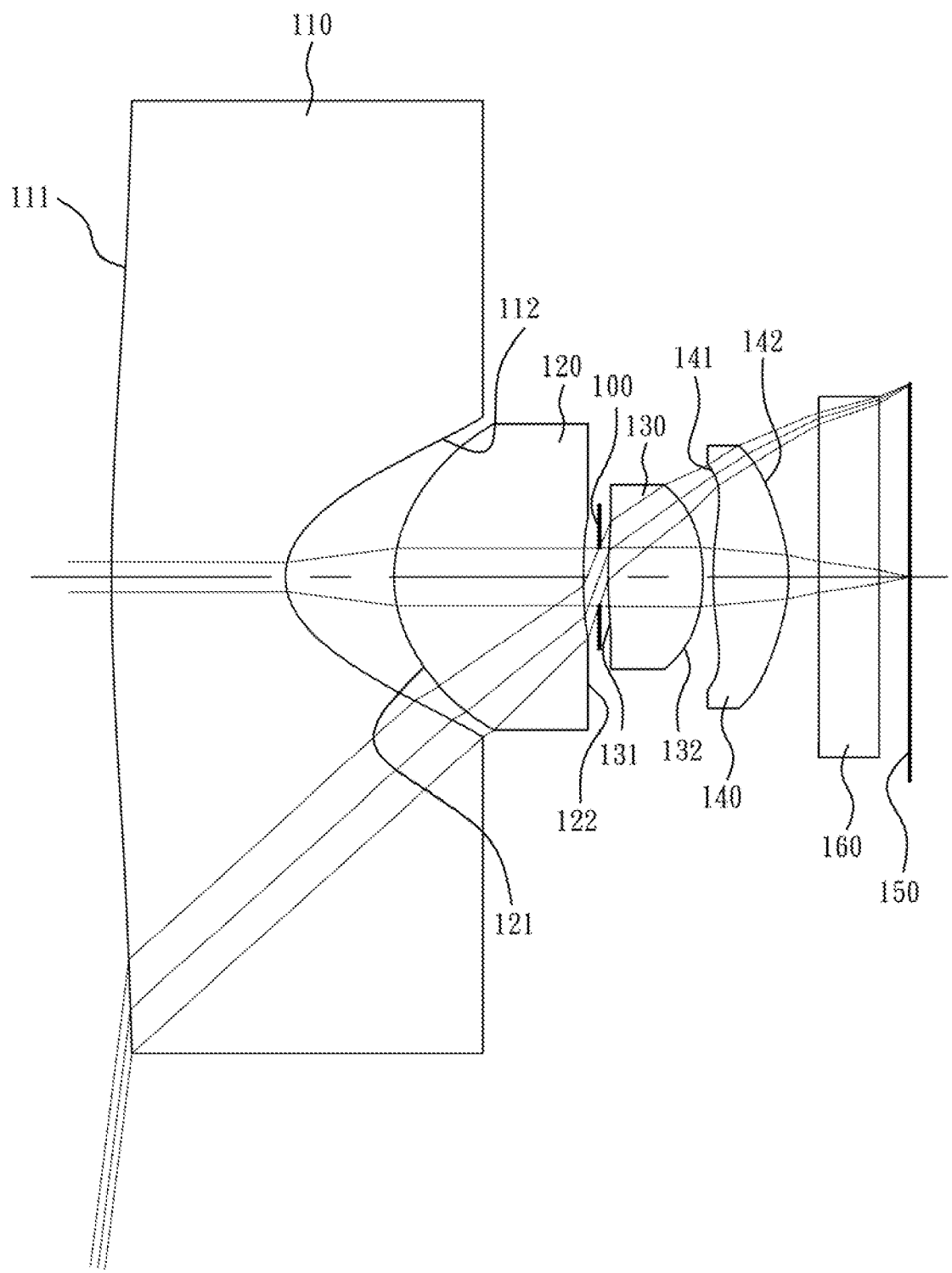
FIG. 1 is a schematic view of a wide-angle optical lens assembly according to the first embodiment.

A wide-angle optical lens assembly includes, in order from an object side to an image side; a first lens element, a second lens element, a third lens element and a fourth lens element. The wide-angle optical lens assembly further includes an image sensor located on the image plane.

The first lens element with a negative refractive power has a concave image-side surface for advantageously increasing the field of view of the wide-angle optical lens assembly, and smoothing refraction of incident light for avoiding large aberrations. Therefore, a proper balance can be established between the increase in field of view of the wide-angle optical lens assembly and the correction of the aberration.

The second lens element with a positive refractive power can provide a partial refractive power for the whole wide-angle optical lens assembly, and has a convex object-side surface for enhancing the refractive power of the second lens element. Therefore, the total track length of the wide-angle optical lens assembly can be effectively reduced for facilitating the lens miniaturization.

The third lens element with a positive refractive power can reduce the photosensitivity of the wide-angle optical lens assembly by providing a partial distribution of the system refractive power.

The fourth lens element with a positive refractive power has a convex image-side surface. Therefore, the high order aberration of the wide-angle optical lens assembly cab be corrected via the convex image-side surface, and the total track length of the wide-angle optical lens assembly can be effectively reduced by the positive refractive power.

A radius of curvature of the image-side surface of the first lens element is R2, a thickness on the optical axis of the first lens element is CT1, and they satisfy the following relationship:

$0.0 < R2/CT1 < 5.0.$

Therefore, the curvature of the image-side surface of the first lens element can enhance the wide-angle characteristic and provide larger field of view.

R2 and CT1 can further satisfy the following relationship:

$0.0 < R2/CT1 < 2.0;$

R2 and CT1 can yet satisfy the following relationship:

$0.0 < R2/CT1 < 0.8.$

A radius of curvature of the object-side surface of the second lens element is R3, a radius of curvature of the image-side surface of the second lens element is R4, and they satisfy the following relationship:

$-3.5 < (R3+R4)/(R3-R4) < 0.0.$

Therefore, the curvature radii of the object-side surface and the image-side surface of the second lens element can advantageously correct the aberration and the astigmatism of the wide-angle optical lens assembly.

R3 and R4 can further satisfy the following relationship:

$-2.5 < (R3+R4)/(R3-R4) < -0.8.$

The thickness on the optical axis of the first lens element is CT1, a thickness on the optical axis of the fourth lens element is CT4, and they satisfy the following relationship:

$0.0 < CT4/CT1 < 1.5.$

Therefore, the thickness configuration between the first lens element and the fourth lens element can avoid the assembling difficulties of lens elements or prevent the total track length from being too long for facilitating the lens miniaturization.

CT4 and CT1 can further satisfy the following relationship:

$0.0 < CT4/CT1 < 0.8.$

The wide-angle optical lens assembly further includes an aperture stop, wherein a distance on the optical axis between the aperture stop and an image plane is SL, a distance on the optical axis between the object-side surface of the first lens element and the image plane is TTL, and they satisfy the following relationship:

$0.1 < SL/TTL < 0.7.$

When the SL/TTL<0.1, the angle of incidence to the image sensor will be too large, which would cause poor photographic performance of the image sensor as well as excessive chromatic aberrations within the wide-angle optical lens assembly. When the SL/TTL>0.7, the total track length of the wide-angle optical lens assembly would be longer than a desirable length. Therefore, when SL/TTL satisfies the above relationship, the wide-angle optical lens assembly can obtain the wide-angle characteristic with maintaining a desirable is total track length of the wide-angle optical lens assembly.

The Abbe number of the first lens element is V1, the Abbe number of the second lens element is V2, and they satisfy the following relationship:

$28 < V1-V2 < 42.$

When the above relation is satisfied, the capability of the wide-angle optical lens assembly for correcting the chromatic aberration can be enhanced.

A focal length of the wide-angle optical lens assembly is f, a focal length of the second lens element is f2, and they satisfy the following relationship:

$0.0 < f/f2 < 0.8.$

Therefore, an inverse telephoto structure can be constructed by the first lens element and the second lens element for obtaining a wide-angle characteristic.

In the wide-angle optical lens assembly, f and f2 can further satisfy the following relationship:

$0.0 < f/f2 < 0.5.$

The wide-angle optical lens assembly further includes an image sensor located on the image plane, wherein a half of a diagonal length of an effective photosensitive area of the image sensor is ImgH, the focal length of the in wide-angle optical lens assembly is f, and they satisfy the following relationship:

$0.2 < f/ImgH < 0.6.$

Therefore, it can be ensured that the field of view of the wide-angle optical lens assembly is sufficient.

A distance on the optical axis between the first lens element and the second lens element is T12, the focal length of the wide-angle optical lens assembly is f, and they satisfy the following relationship:

$0.8 < T12/f < 5.0$.

When the above relationship is satisfied, the distance on the optical axis between the first lens element and the second lens element can advantageously reduce the total track length of the wide-angle optical lens assembly.

In the wide-angle optical lens assembly, T12 and f can further satisfy the following relationship:

$1.3 < T12/f < 3.5$.

The horizontal distance between the position of the maximum range of the incident light which passing through the object-side surface of the first lens element and the intersection point of the optical axis and the object-side surface of the first lens element is SAG11, and the horizontal distance between the position of the maximum range of the incident light which passing through the image-side surface of the first lens element and the intersection point of the optical axis and the image-side surface of the first lens element is SAG12, and they satisfy the following relationship:

$|SAG11/SAG12| < 0.25$.

Therefore, the shape of the first lens element can be controlled for reducing the refraction of the incident light while enhancing the view angle of the wide-angle optical lens assembly, so that excessive aberration of the wide-angle optical lens assembly can be avoided.

A radius of curvature of the image-side surface of the third lens element is R6, a radius of curvature of the object-side surface of the fourth lens element is R7, the focal length of the wide-angle optical lens assembly is f, and they satisfy the following relationship:

$1.0 < |R6 - R7|/f$.

Therefore, the high order aberration of the wide-angle optical lens assembly can be corrected.

The focal length of the wide-angle optical lens assembly is f, a focal length of the third lens element is f3, and they satisfy the following relationship:

$-0.1 < f/f3 < 0.3$.

Therefore, the third lens element can effectively correct the aberration of the wide-angle optical lens assembly.

According to the wide-angle optical lens assembly of the present invention, if a lens element has a convex surface, it means that the paraxial region of the surface is convex, and if a lens element has a concave surface, it means that the paraxial region of the surface is concave.

According to the wide-angle optical lens assembly of the present invention, a lens element can be made of glass material or plastic material. When the lens element is made of glass material, the distribution of degree of freedom of the refractive power of the wide-angle optical lens assembly can be increased. When the lens element is made of plastic material, the cost of manufacturing can be effectively reduced. Additionally, the surfaces of the lens element can be aspheric, so as to easily form the surfaces into non-spherical profiles, thereby obtaining more controllable variables for reducing aberration and amount of the required lens elements. Therefore, the total track length of the wide-angle optical lens assembly can be reduced.

According to the wide-angle optical lens assembly of the present invention, the wide-angle optical lens assembly can include at least one stop for reducing stray light while retaining high image quality.

According to the above description of the present invention, the following 1st-6th specific embodiments are provided for further explanation.

Figure 2:
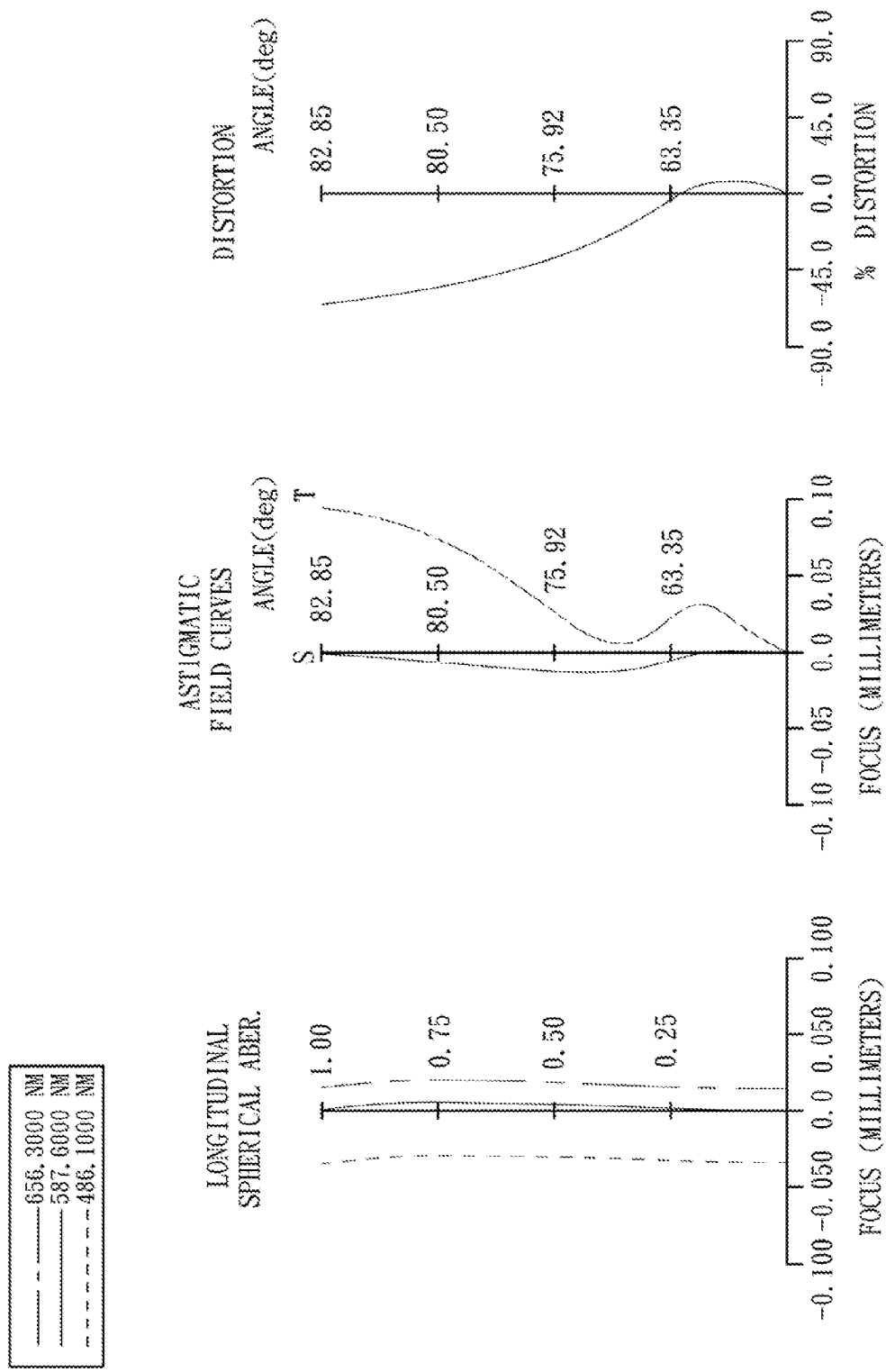
FIG. 2 shows spherical aberration curves, astigmatic field curves and distortion curve of the wide-angle optical lens assembly according to the first embodiment.

FIG. 1 is a schematic view of a wide-angle optical lens assembly according to the first embodiment. FIG. 2 shows spherical aberration curves, astigmatic field curves and distortion curve of the wide-angle optical lens assembly according to the first embodiment. In FIG. 1, the wide-angle optical lens assembly includes, in order from an object side to an image side: the first lens element 110, the second lens element 120, an aperture stop 100, the third lens element 130, the fourth lens element 140, an IR (infrared) cut filter 160 and an image plane 150.

The first lens element 110 is made of plastic material. The first lens element 110 with a negative refractive power has a convex object-side surface 111 and a concave image-side surface 112. The object-side surface 111 and the image-side surface 112 of the first lens element 110 are aspheric.

The second lens element 120 is made of plastic material. The second lens element 120 with a positive refractive power has a convex object-side surface 121 and a concave image-side surface 122. The object-side surface 121 and the image-side surface 122 of the second lens element 120 are aspheric.

The third lens element 130 is made of plastic material. The third lens element 130 with a positive refractive power has a convex object-side surface 131 and a convex image-side surface 132. The object-side surface 131 and the image-side surface 132 of the third lens element 130 are aspheric.

The fourth lens element 140 is made of plastic material. The fourth lens element 140 with a positive refractive power has a convex object-side surface 141 and a convex image-side surface 142. The object-side surface 141 and the image-side surface 142 of the fourth lens element 140 are aspheric.

The IR cut filter 160 is made of glass and is located between the fourth lens element 140 and the image plane 150 with no influence on the focal length of the wide-angle optical lens assembly.

The equation of the aspheric surface profiles of the aforementioned lens elements of the first embodiment is expressed as follows:

$$X(Y) = (Y^2/R)/(1 + sqrt(1 - (1+k) \times (Y/R)^2)) + \sum_i (Ai) \times (Y^i)$$

wherein:

X: the height of a point on the aspheric surface spaced at a distance Y from the optical axis relative to the tangential plane at the aspheric surface vertex;

Y: the distance from the point on the curve of the aspheric surface to the optical axis;

k: the conic coefficient; and

Ai: the i-th aspheric coefficient

In the wide-angle optical lens assembly according to the first embodiment, f is a focal length of the wide-angle optical lens assembly, Fno is an f-number of the wide-angle optical lens assembly, HFOV is half of the maximal field of view, and they satisfy the following relationships:

$f = 0.81$ mm;

$Fno = 2.40$;

and

HFOV=82.8 degrees.

In the wide-angle optical lens assembly according to the first embodiment, V1 is an Abbe number of the first lens element 110, V2 is an Abbe number of the second lens element 120, and they satisfy the following relationship:

$V1-V2=33.0$.

In the wide-angle optical lens assembly according to the first embodiment, R2 is a radius of curvature of the image-side surface 112 of the first lens element 110, CT4 is a thickness on the optical axis of the fourth lens element 140, CT1 is a thickness on the optical axis of the first lens element 110, and they satisfy the following relationships:

$R2/CT1=0.34$;

and $CT4/CT1=0.43$.

In the wide-angle optical lens assembly according to the first embodiment, T12 is a distance on the optical axis between the first lens element 110 and the second lens element 120, f is the focal length of the wide-angle optical lens assembly, and they satisfy the following relationship:

$T12/f=1.54$.

In the wide-angle optical lens assembly according to the first embodiment, R3 is a radius of curvature of the object-side surface 121 of the second lens element 120, R4 is a radius of curvature of the image-side surface 122 of the second lens element 120, and they satisfy the following relationship:

$(R3+R4)/(R3-R4)=-1.55$.

In the wide-angle optical lens assembly according to the first embodiment, f is the focal length of the wide-angle optical lens assembly, R6 is a radius of curvature of the image-side surface 132 of the third lens element 130, R7 is a radius of curvature of the object-side surface 141 of the fourth lens element 140, and they satisfy the following relationship:

$|R6-R7|/f=6.74$.

In the wide-angle optical lens assembly according to the first embodiment, f is the focal length of the wide-angle optical lens assembly, f2 is a focal length of the second lens element 120, f3 is a focal length of the third lens element 130, and they satisfy the following relationships:

$f/f2=0.281$;

and $f/f3=0.271$.

Figure 15:
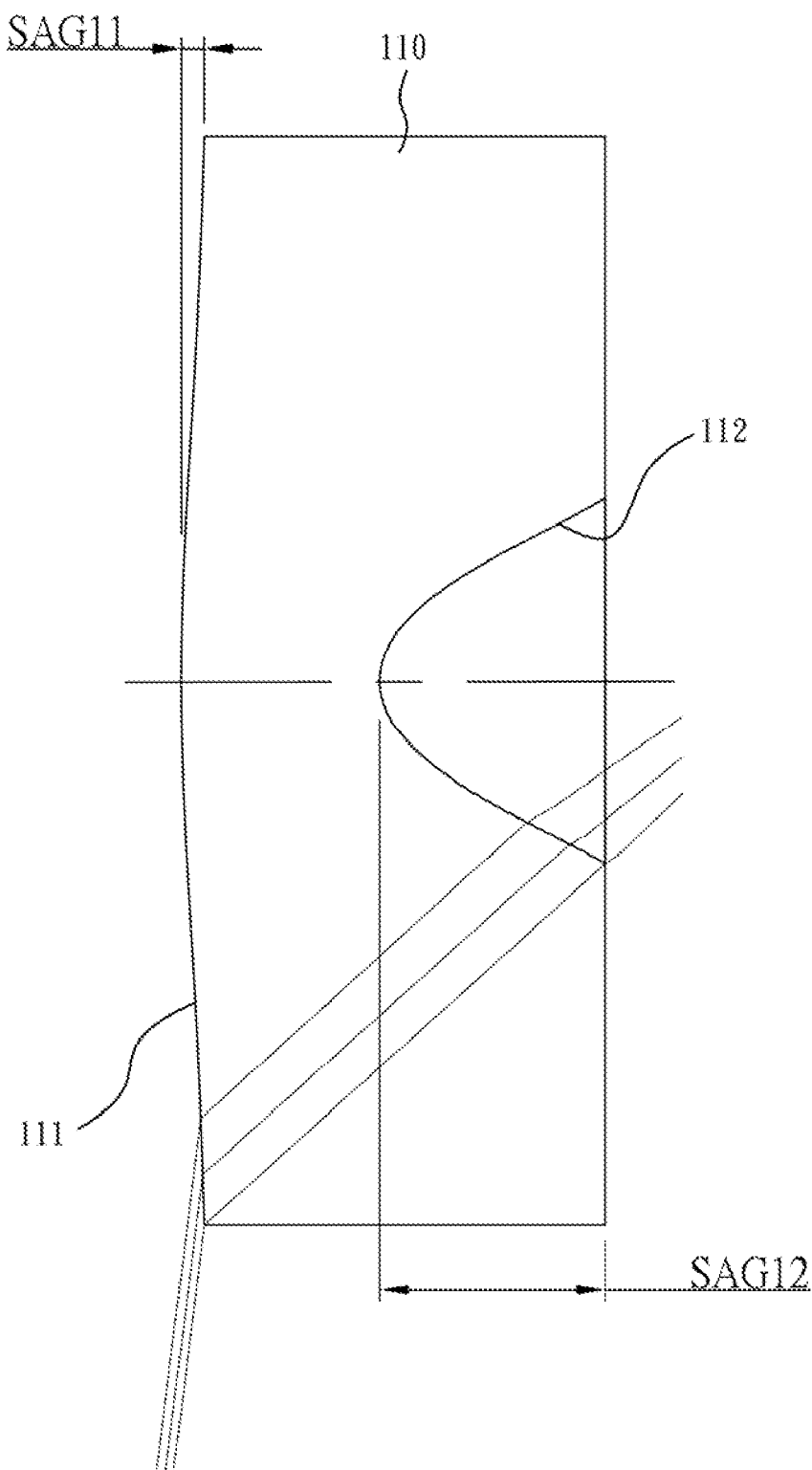
FIG. 15 shows the incident light passing through the first lens element 100 of the wide-angle optical lens assembly according to the first embodiment.

Referring to the FIG. 15, FIG. 15 shows the incident light passing through the first lens element 100 of the wide-angle optical lens assembly according to the first embodiment. In the wide-angle optical lens assembly according to the first embodiment, the horizontal distance between the position of the maximum range of the incident light which passing through the object-side surface 111 of the first lens element 110 and the intersection point of the optical axis and the object-side surface 111 of the first lens element 110 is SAG11, and the horizontal distance between the position of the maximum range of the incident light which passing through the image-side surface 112 of the first lens element 110 and the intersection point of the optical axis and the image-side surface 112 of the first lens element 110 is SAG12, and they satisfy the following relationship:

$|SAG11/SAG12|=0.10$.

In the wide-angle optical lens assembly according to the first embodiment, the wide-angle optical lens assembly further includes an image sensor, wherein the image sensor is located on the image plane 150. ImgH is a half of a diagonal length of an effective photosensitive area of the image sensor, f is the focal length of the wide-angle optical lens assembly, and they satisfy the following relationships:

$f/ImgH=0.36$.

In the wide-angle optical lens assembly according to the first embodiment, SL is a distance on the optical axis between the aperture stop 100 and the image plane 150, TTL is a distance on the optical axis between the object-side surface 111 of the first lens element 110 and the image plane 150, and they satisfy the following relationship:

$SL/TTL=0.37$.

The detailed optical data of the first embodiment is shown in Table 1, and the aspheric surface data is shown in Table 2 as follows.

TABLE 1

1st Embodiment
f = 0.81 mm, Fno = 2.40, HFOV = 82.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 25.408600 (ASP) | 2.013 | Plastic | 1.532 | 56.0 | −1.34 |
| 2 | | 0.676030 (ASP) | 1.255 | | | | |
| 3 | Lens 2 | 1.636740 (ASP) | 2.200 | Plastic | 1.632 | 23.0 | 2.89 |
| 4 | | 7.556600 (ASP) | 0.180 | | | | |
| 5 | Ape. Stop | Plano | 0.100 | | | | |
| 6 | Lens 3 | 5.667800 (ASP) | 1.100 | Plastic | 1.512 | 57.0 | 2.99 |
| 7 | | −1.962280 (ASP) | 0.119 | | | | |
| 8 | Lens 4 | 3.499000 (ASP) | 0.875 | Plastic | 1.512 | 57.0 | 2.37 |
| 9 | | −1.698590 (ASP) | 0.346 | | | | |
| 10 | IR-filter | Plano | 0.700 | Glass | 1.517 | 64.2 | — |
| 11 | | Plano | 0.357 | | | | |
| 12 | Image | Plano | — | | | | |

The reference wavelength (d-line) is 587.6 nm.

TABLE 2

Aspheric Coefficients

| Surface # | 1 | 2 | 3 | 4 |
|---|---|---|---|---|
| k = | 1.16699E+01 | −9.15435E−01 | −7.59798E−01 | 8.30401E+01 |
| A4 = | −7.86024E−04 | −2.25124E−02 | 5.54495E−03 | 5.72479E−02 |
| A6 = | 1.01292E−05 | −1.18595E−02 | −1.32088E−02 | −2.84834E−02 |
| A8 = | −2.17169E−08 | 5.53539E−04 | 1.11459E−03 | −1.38442E−02 |
| A10 = | −1.35954E−09 | −4.51931E−04 | 2.81119E−06 | |

| Surface # | 6 | 7 | 8 | 9 |
|---|---|---|---|---|
| k = | 0.00000E+00 | −7.84868E−01 | 0.00000E+00 | 0.00000E+00 |
| A4 = | −3.20690E−02 | −2.31457E−02 | −5.37562E−02 | 1.03804E−01 |
| A6 = | 3.86244E−02 | −1.77835E−01 | −2.19068E−02 | 1.47059E−02 |
| A8 = | −4.79236E−02 | 1.33159E−01 | −2.43482E−03 | −3.17488E−02 |
| A10 = | | −4.15319E−02 | −2.38678E−03 | 8.13593E−03 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A10 represent the aspheric coefficients ranging from the 1st order to the 10th. All labels for Tables of the remaining embodiments share the same definitions as those in Table 1 and Table 2 of the to first embodiment, and their definitions will not be stated again.

Figure 3:
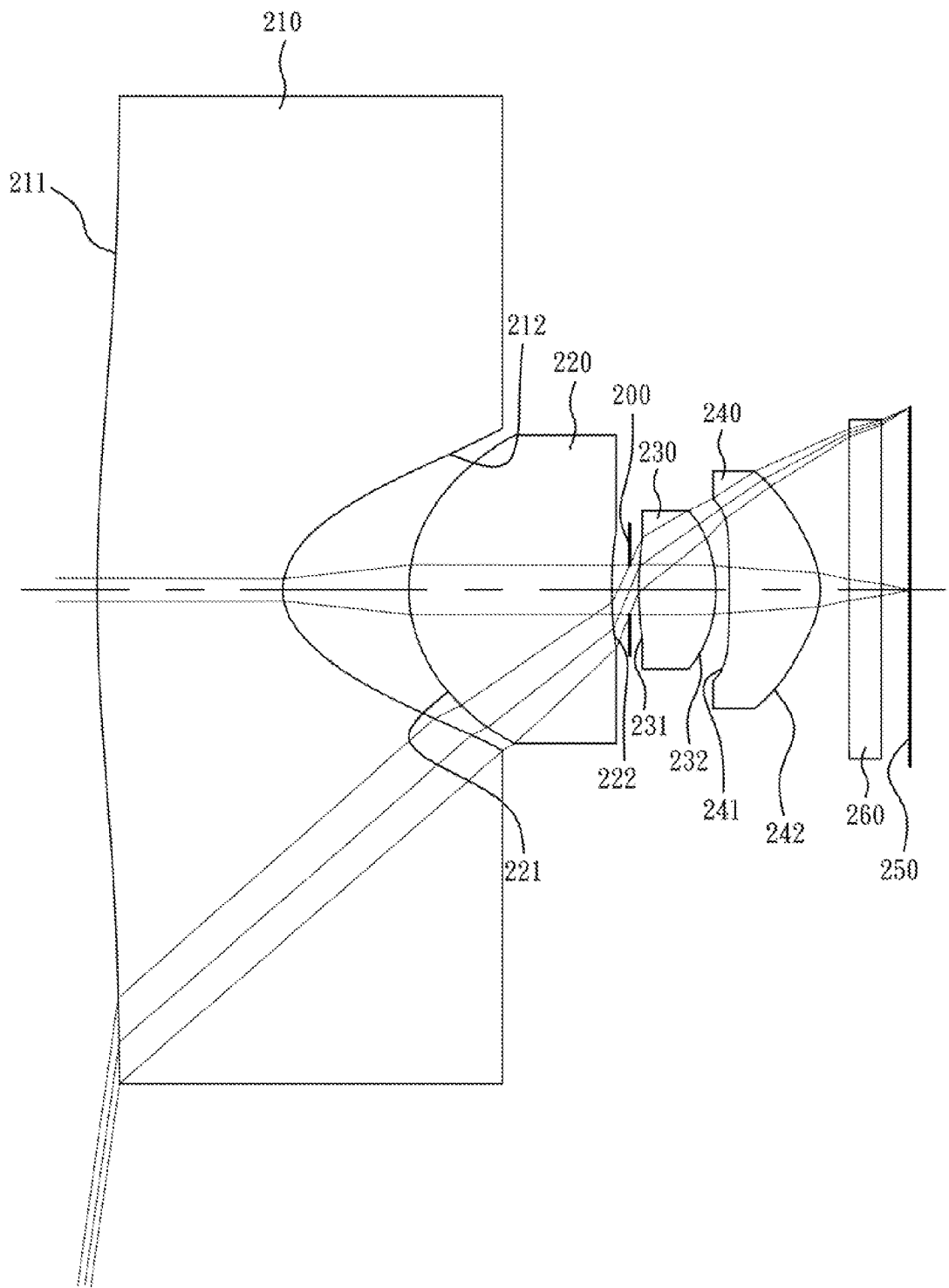
FIG. 3 is a schematic view of a wide-angle optical lens assembly according to the second embodiment.
Figure 4:
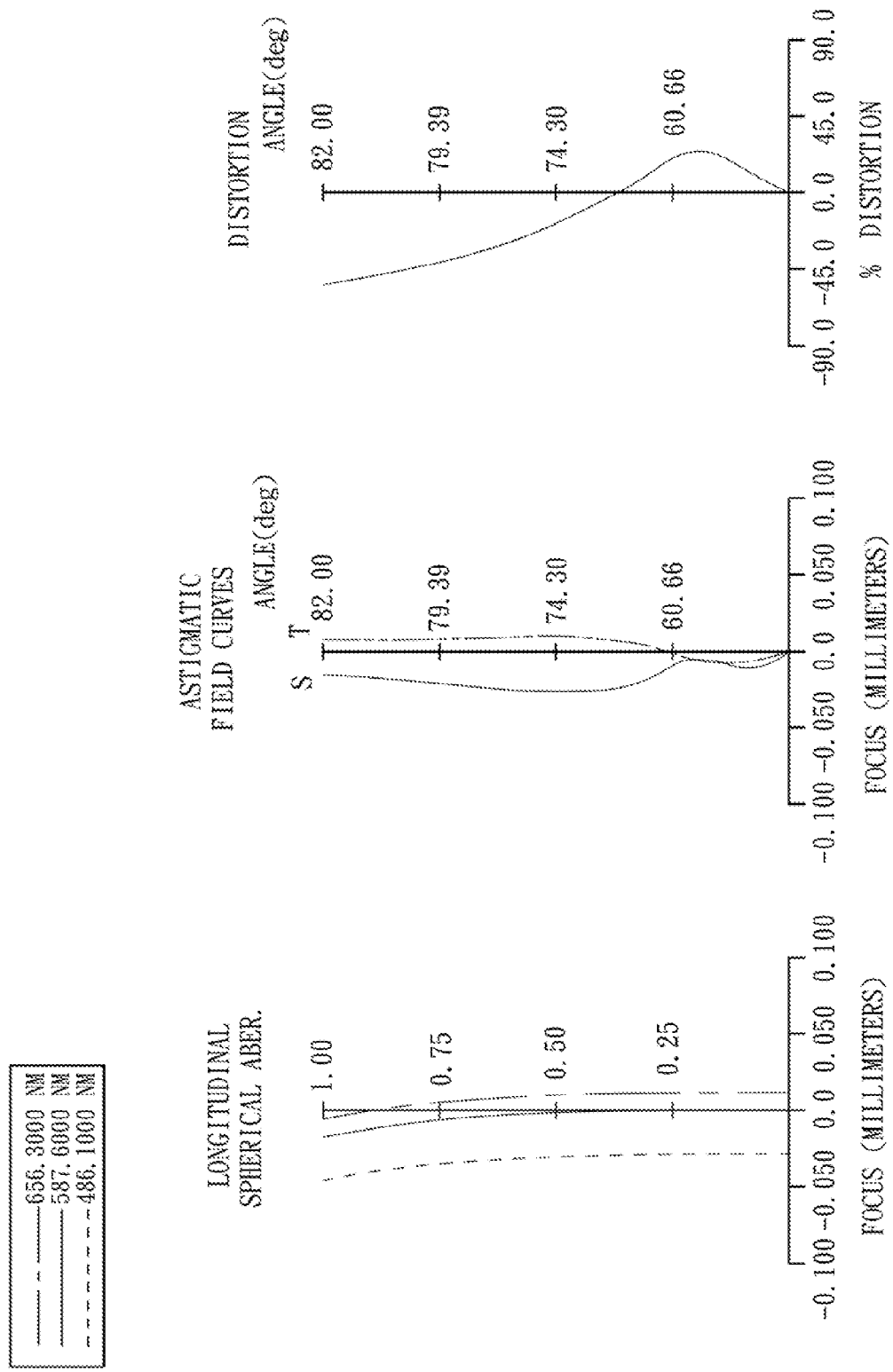
FIG. 4 shows spherical aberration curves, astigmatic field curves and distortion curve of the wide-angle optical lens assembly according to the second embodiment.

FIG. 3 is a schematic view of a wide-angle optical lens assembly according to the second embodiment. FIG. 4 shows spherical aberration curves, astigmatic field curves and distortion curve of the wide-angle optical lens assembly according to the second embodiment. In FIG. 3, the wide-angle is optical lens assembly includes, in order from an object side to an image side: the first lens element 210, the second lens element 220, an aperture stop 200, the third lens element 230, the fourth lens element 240, an IR (infrared) cut filter 260 and an image plane 250.

The first lens element 210 is made of plastic material. The first lens element 210 with a negative refractive power has a convex object-side surface 211 and a concave image-side surface 212. The object-side surface 211 and the image-side surface 212 of the first lens element 210 are aspheric.

The second lens element 220 is made of plastic material. The second lens element 220 with a positive refractive power has a convex object-side surface 221 and a concave image-side surface 222. The object-side surface 221 and the image-side surface 222 of the second lens element 220 are aspheric.

The third lens element 230 is made of plastic material. The third lens element 230 with a positive refractive power has a convex object-side surface 231 and a convex image-side surface 232. The object-side surface 231 and the image-side surface 232 of the third lens element 230 are aspheric.

The fourth lens element 240 is made of plastic material. The fourth lens element 240 with a positive refractive power has a concave object-side surface 241 and a convex image-side surface 242. The object-side surface 241 and is the image-side surface 242 of the fourth lens element 240 are aspheric.

The IR cut filter 260 is made of glass and is located between the fourth lens element 240 and the image plane 250 with no influence on the focal length of the wide-angle optical lens assembly.

The equation of the aspheric surface profiles of the aforementioned lens elements of the second embodiment is the same as that of the first embodiment, and will not be stated herein again.

In the wide-angle optical lens assembly according to the second embodiment, the definitions of f, Fno, HFOV, V1, V2, R2, R3, R4, R6, R7, CT1, CT4, T12, f2, f3, SAG11, SAG12, ImgH, SL and TTL are the same as those stated in the first embodiment with corresponding values for the second embodiment, and they satisfy the following relationships:

| f(mm) | 0.69 | (R3 + R4)/(R3 − R4) | −1.50 |
|---|---|---|---|
| Fno | 2.40 | |R6 − R7|/f | 17.39 |
| HFOV(degrees) | 82.0 | f/f2 | 0.218 |
| V1−V2 | 32.0 | f/f3 | 0.290 |
| R2/CT1 | 0.30 | |SAG11/SAG12| | 0.10 |
| CT4/CT1 | 0.49 | f/ImgH | 0.31 |
| T12/f | 2.25 | SL/TTL | 0.34 |

The detailed optical data of the second embodiment is shown in Table 3, and the aspheric surface data is shown in Table 4 as follows.

TABLE 3

2nd Embodiment
f = 0.69 mm, Fno = 2.40, HFOV = 82.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 20.753600 (ASP) | 2.284 | Plastic | 1.530 | 55.8 | −1.37 |
| 2 | | 0.676030 (ASP) | 1.553 | | | | |
| 3 | Lens 2 | 1.817830 (ASP) | 2.500 | Plastic | 1.634 | 23.8 | 3.16 |
| 4 | | 9.038600 (ASP) | 0.218 | | | | |
| 5 | Ape. Stop | Plano | 0.111 | | | | |
| 6 | Lens 3 | 4.410500 (ASP) | 0.951 | Plastic | 1.514 | 56.8 | 2.38 |
| 7 | | −1.569770 (ASP) | 0.165 | | | | |
| 8 | Lens 4 | −13.570400 (ASP) | 1.118 | Plastic | 1.514 | 56.8 | 2.02 |
| 9 | | −0.988870 (ASP) | 0.354 | | | | |
| 10 | IR-filter | Plano | 0.400 | Glass | 1.517 | 64.2 | — |
| 11 | | Plano | 0.350 | | | | |
| 12 | Image | Plano | — | | | | |

The reference wavelength (d-line) is 587.6 nm.

TABLE 4

Aspheric Coefficients

| Surface # | 1 | 2 | 3 | 4 |
|---|---|---|---|---|
| k = | 4.32473E+00 | −9.15443E−01 | −4.18775E−01 | 5.00000E+00 |
| A4 = | −8.67784E−04 | −1.90970E−02 | 9.08922E−03 | 8.74404E−02 |
| A6 = | 8.69219E−06 | −9.97416E−03 | −3.61531E−03 | −1.47981E−02 |
| A8 = | 4.97169E−08 | 1.56406E−03 | 1.21231E−03 | −1.92328E−02 |
| A10 = | −1.41011E−09 | −6.35190E−04 | −1.46540E−04 | 8.87190E−02 |

| Surface # | 6 | 7 | 8 | 9 |
|---|---|---|---|---|
| k = | 4.14588E+00 | −1.65566E−01 | −1.00000E+00 | −6.48809E−01 |
| A4 = | −1.42760E−02 | 1.42352E−01 | 5.70977E−02 | 1.84832E−01 |
| A6 = | 4.60424E−02 | −3.04679E−01 | −1.47259E−01 | 1.16912E−02 |
| A8 = | −6.39053E−02 | 1.86984E−01 | 4.00825E−02 | −4.07328E−02 |
| A10 = | 2.96453E−02 | −2.97659E−02 | −1.55294E−02 | 1.22181E−02 |

Figure 5:
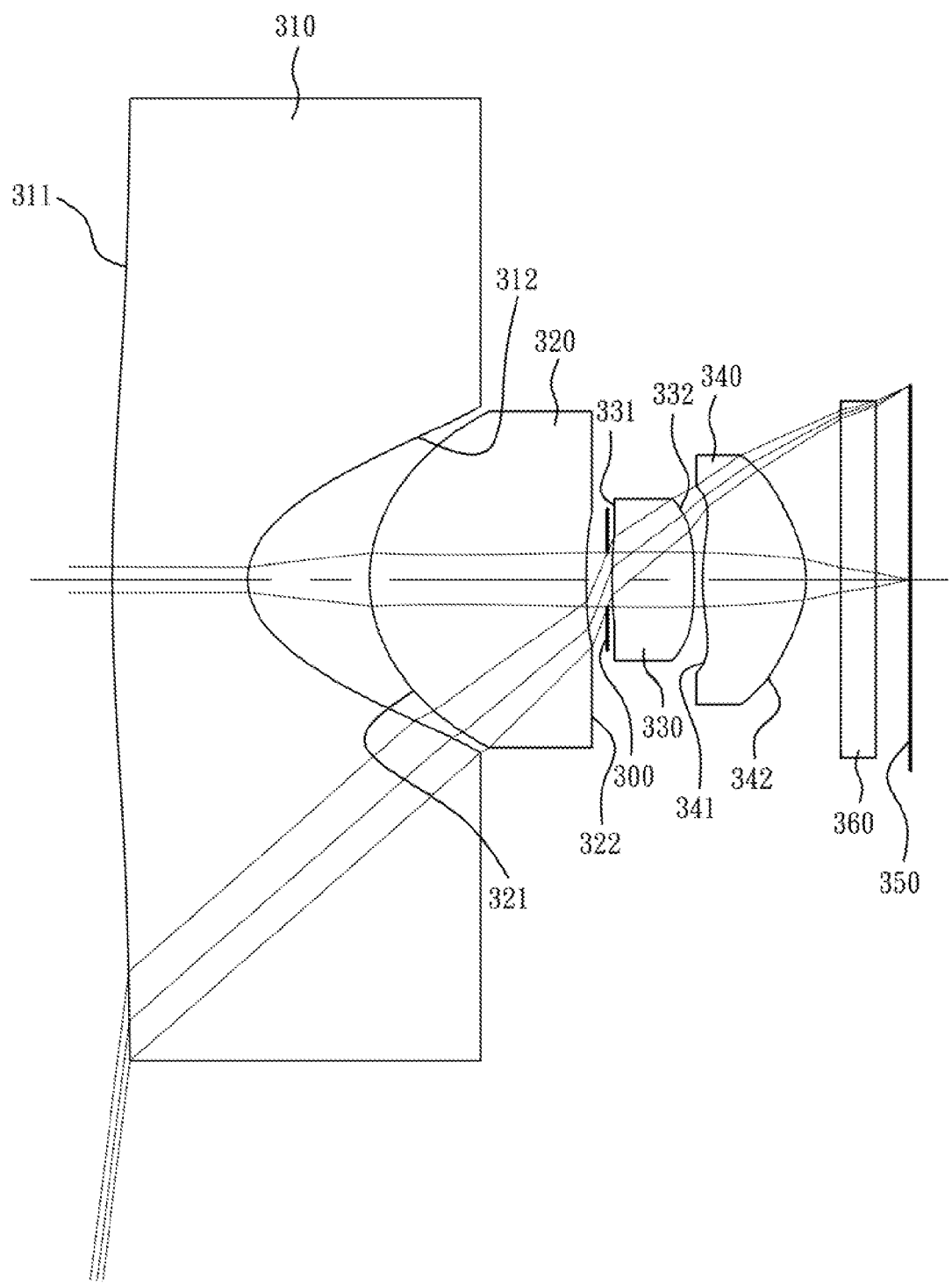
FIG. 5 is a schematic view of a wide-angle optical lens assembly according to the third embodiment.
Figure 6:
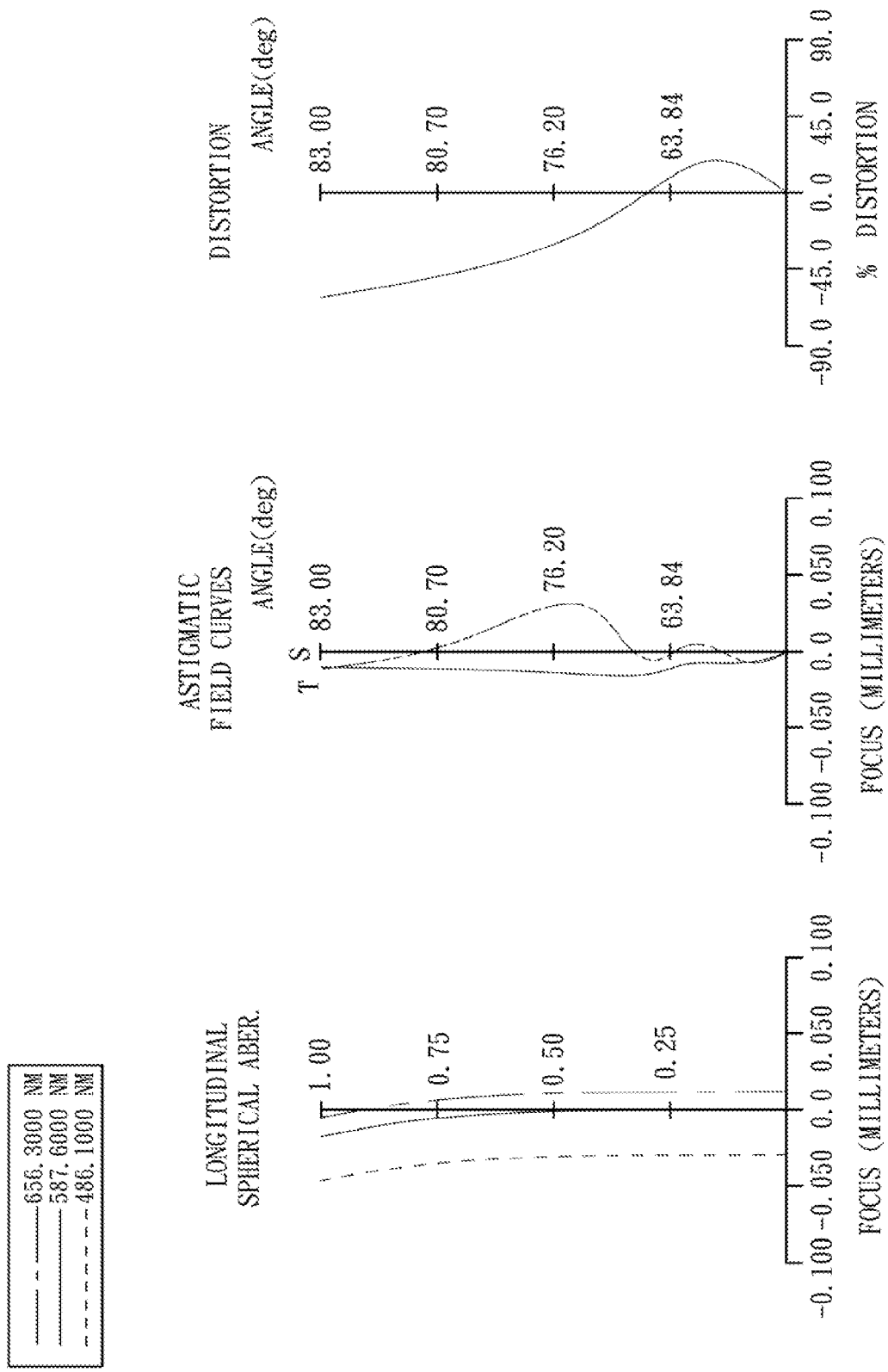
FIG. 6 shows spherical aberration curves, astigmatic field curves and distortion curve of the wide-angle optical lens assembly according to the third embodiment.

FIG. 5 is a schematic view of a wide-angle optical lens assembly according to the third embodiment. FIG. 6 shows spherical aberration curves, astigmatic field curves and distortion curve of the wide-angle optical lens assembly according to the third embodiment. In FIG. 5, the wide-angle optical lens assembly includes, in order from an object side to an image side: the first to lens element 310, the second lens element 320, an aperture stop 300, the third lens element 330, the fourth lens element 340, an IR (infrared) cut filter 360 and an image plane 350.

The first lens element 310 is made of plastic material. The first lens element 310 with a negative refractive power has a convex object-side surface 311 and a concave image-side surface 312. The object-side surface 311 and the image-side surface 312 of the first lens element 310 are aspheric.

The second lens element 320 is made of plastic material. The second lens element 320 with a positive refractive power has a convex object-side surface 321 and a concave image-side surface 322. The object-side surface 321 and the image-side surface 322 of the second lens element 320 are aspheric.

The third lens element 330 is made of plastic material. The third lens element 330 with a positive refractive power has a convex object-side surface 331 and a convex image-side surface 332. The object-side surface 331 and the image-side surface 332 of the third lens element 330 are aspheric.

The fourth lens element 340 is made of plastic material. The fourth lens element 340 with a positive refractive power has a convex object-side surface 341 and a convex image-side surface 342. The object-side surface 341 and the image-side surface 342 of the fourth lens element 340 are aspheric.

The IR cut filter 360 is made of glass and is located between the fourth lens element 340 and the image plane 350 with no influence on the focal length of the wide-angle optical lens assembly.

The equation of the aspheric surface profiles of the above lens elements of the third embodiment is the same as that of the first embodiment, and will not be stated herein again.

In the wide-angle optical lens assembly according to the third embodiment, the definitions of f, Fno, HFOV, V1, V2, R2, R3, R4, R6, R7, CT1, CT4, T12, f2, f3, SAG11, SAG12, ImgH, SL and TTL are the same as those stated in the first embodiment with corresponding values for the third embodiment, and they satisfy the following relationships:

| | | | |
|---|---|---|---|
| f(mm) | 0.72 | (R3 + R4)/(R3 − R4) | −1.51 |
| Fno | 2.40 | \|R6 − R7\|/f | 10.47 |
| HFOV(degrees) | 83.0 | f/f2 | 0.230 |
| V1-V2 | 32.0 | f/f3 | 0.146 |
| R2/CT1 | 0.44 | \|SAG11/SAG12\| | 0.07 |
| CT4/CT1 | 0.77 | f/ImgH | 0.32 |
| T12/f | 1.96 | SL/TTL | 0.37 |

The detailed optical data of the third embodiment is shown in Table 5, and the aspheric surface data is shown in Table 6 as follows.

TABLE 5

3rd Embodiment
f = 0.72 mm, Fno = 2.40, HFOV = 83.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 23.407600 (ASP) | 1.558 | Plastic | 1.530 | 55.8 | −1.36 |
| 2 | | 0.681320 (ASP) | 1.410 | | | | |
| 3 | Lens 2 | 1.792110 (ASP) | 2.500 | Plastic | 1.634 | 23.8 | 3.12 |
| 4 | | 8.810600 (ASP) | 0.244 | | | | |
| 5 | Ape. Stop | Plano | 0.050 | | | | |
| 6 | Lens 3 | 4.777300 (ASP) | 0.949 | Plastic | 1.514 | 56.8 | 4.93 |
| 7 | | −5.017000 (ASP) | 0.094 | | | | |
| 8 | Lens 4 | 2.518730 (ASP) | 1.195 | Plastic | 1.514 | 56.8 | 1.67 |
| 9 | | −1.088420 (ASP) | 0.403 | | | | |
| 10 | IR-filter | Plano | 0.400 | Glass | 1.517 | 64.2 | — |
| 11 | | Plano | 0.402 | | | | |
| 12 | Image | Plano | — | | | | |

The reference wavelength (d-line) is 587.6 nm.

TABLE 6

Aspheric Coefficients

| Surface # | 1 | 2 | 3 | 4 |
|---|---|---|---|---|
| k = | 5.14427E+00 | −9.12973E−01 | −5.64934E−01 | 4.95827E+00 |
| A4 = | −9.56895E−04 | −2.68009E−02 | 1.10884E−02 | 8.12012E−02 |
| A6 = | 1.32728E−05 | −7.08899E−03 | −3.94040E−03 | −1.27056E−02 |
| A8 = | 8.29229E−08 | 1.42594E−03 | 1.76285E−03 | −2.00209E−02 |
| A10 = | −2.97322E−09 | −6.88680E−04 | −1.99072E−04 | 5.89330E−02 |

TABLE 6-continued

Aspheric Coefficients

| Surface # | 6 | 7 | 8 | 9 |
|---|---|---|---|---|
| k = | 2.68030E+00 | 7.32190E+00 | −1.00000E+00 | −5.95290E−01 |
| A4 = | −1.43396E−02 | −1.41009E−01 | −1.72883E−01 | 1.96085E−01 |
| A6 = | −3.05178E−02 | −2.08103E−01 | 3.53527E−02 | −4.44116E−03 |
| A8 = | −1.63667E−02 | 2.32367E−01 | −7.07624E−02 | −4.65379E−02 |
| A10 = | 8.72273E−02 | −9.82784E−02 | 5.57994E−03 | 1.39106E−02 |

Figure 7:
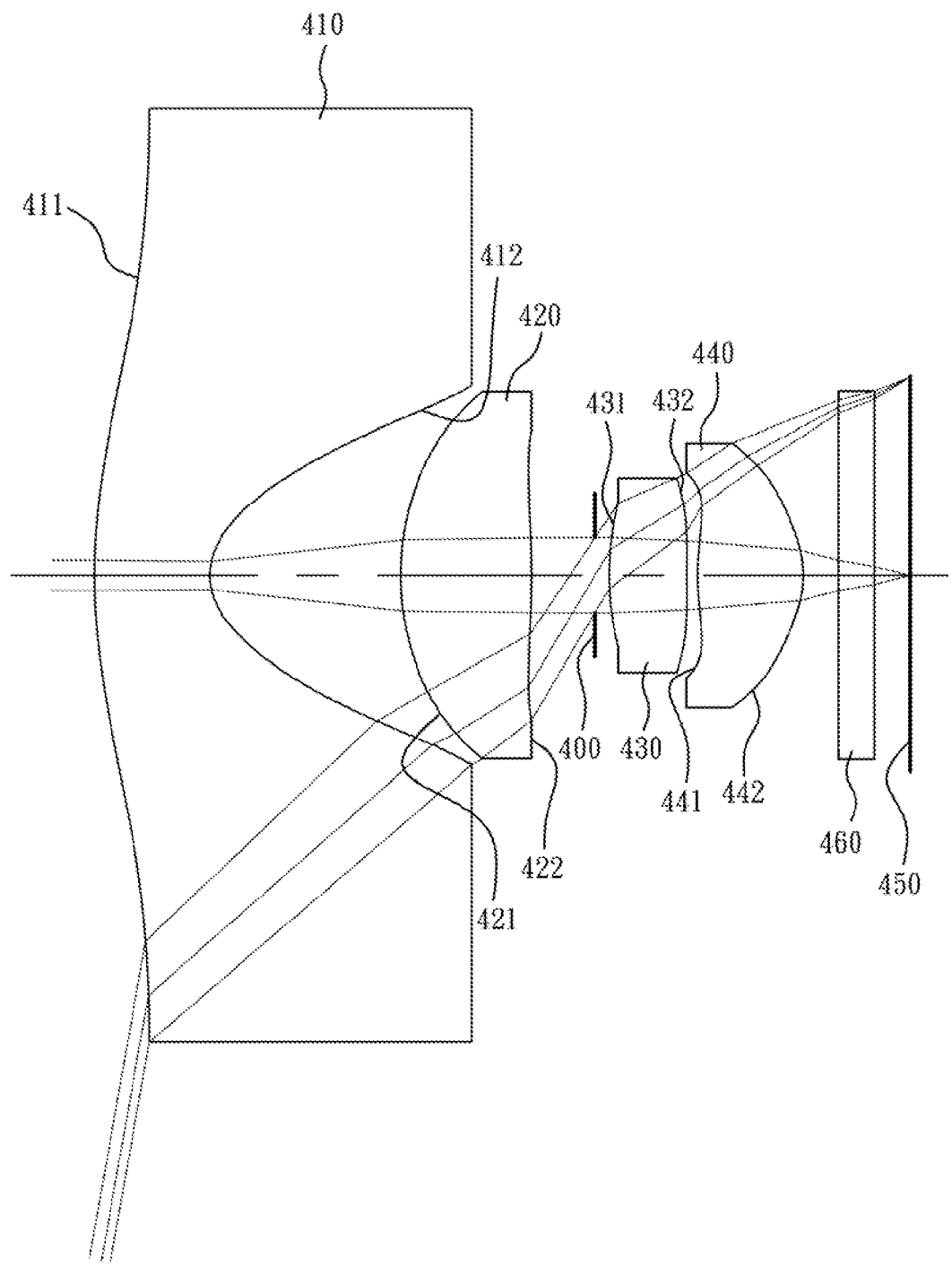
FIG. 7 is a schematic view of a wide-angle optical lens assembly according to the fourth embodiment.
Figure 8:
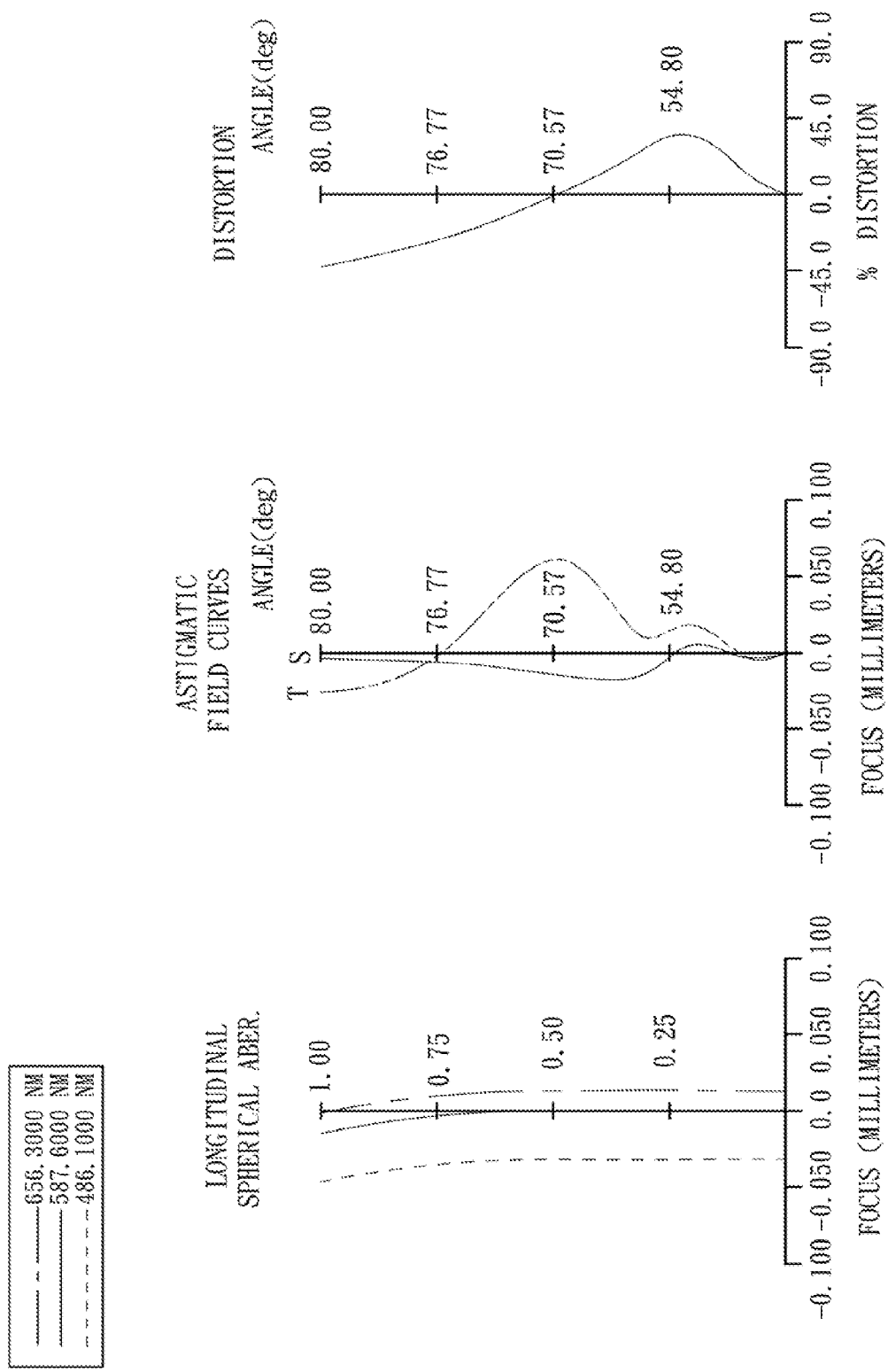
FIG. 8 shows spherical aberration curves, astigmatic field curves and distortion curve of the wide-angle optical lens assembly according to the fourth embodiment.

FIG. 7 is a schematic view of a wide-angle optical lens assembly according to the fourth embodiment. FIG. 8 shows spherical aberration curves, astigmatic field curves and distortion curve of the wide-angle optical lens assembly according to the fourth embodiment. In FIG. 7, the wide-angle optical lens assembly includes, in order from an object side to an image side: the first lens element 410, the second lens element 420, an aperture stop 400, the third lens element 430, the fourth lens element 440, an IR (infrared) cut filter 460 and an image plane 450.

The first lens element 410 is made of plastic material. The first lens element 410 with a negative refractive power has a convex object-side surface 411 and a concave image-side surface 412. The object-side surface 411 and the image-side surface 412 of the first lens element 410 are aspheric.

The second lens element 420 is made of plastic material. The second lens element 420 with a positive refractive power has a convex object-side surface 421 and a convex image-side surface 422. The object-side surface 421 and the image-side surface 422 of the second lens element 420 are aspheric.

The third lens element 430 is made of plastic material. The third lens element 430 with a positive refractive power has a convex object-side surface 431 and a concave image-side surface 432. The object-side surface 431 and the image-side surface 432 of the third lens element 430 are aspheric.

The fourth lens element 440 is made of plastic material. The fourth lens element 440 with a positive refractive power has a convex object-side surface 441 and a convex image-side surface 442. The object-side surface 441 and the image-side surface 442 of the fourth lens element 440 are aspheric.

The IR cut filter 460 is made of glass and is located between the fourth lens element 440 and the image plane 450 with no influence on the focal length of the wide-angle optical lens assembly.

The equation of the aspheric surface profiles of the above lens elements is of the fourth embodiment is the same as that of the first embodiment, and will not be stated herein again.

In the wide-angle optical lens assembly according to the fourth embodiment, the definitions of f, Fno, HFOV, V1, V2, R2, R3, R4, R6, R7, CT1, CT4, T12, f2, f3, SAG11, SAG12, ImgH, SL and TTL are the same as those stated in the first embodiment with corresponding values for the fourth embodiment, and they satisfy the following relationships:

| f(mm) | 0.69 | (R3 + R4)/(R3 − R4) | −0.54 |
|---|---|---|---|
| Fno | 2.00 | |R6 − R7|/f | 181.84 |
| HFOV(degrees) | 80.0 | f/f2 | 0.180 |
| V1-V2 | 32.0 | f/f3 | 0.105 |
| R2/CT1 | 0.54 | |SAG11/SAG12| | 0.21 |
| CT4/CT1 | 0.92 | f/ImgH | 0.31 |
| T12/f | 3.14 | SL/TTL | 0.38 |

The detailed optical data of the fourth embodiment is shown in Table 7, and the aspheric surface data is shown in Table 8 as follows.

TABLE 7

4th Embodiment
f = 0.69 mm, Fno = 2.00, HFOV = 80.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 6.890900 | (ASP) | 1.300 | Plastic | 1.530 | 55.8 | −1.59 |
| 2 | | 0.700620 | (ASP) | 2.156 | | | | |
| 3 | Lens 2 | 3.006500 | (ASP) | 1.476 | Plastic | 1.634 | 23.8 | 3.83 |
| 4 | | −10.166700 | (ASP) | 0.716 | | | | |
| 5 | Ape. Stop | Plano | | 0.159 | | | | |
| 6 | Lens 3 | 3.296100 | (ASP) | 0.880 | Plastic | 1.514 | 56.8 | 6.57 |
| 7 | | 128.437000 | (ASP) | 0.118 | | | | |
| 8 | Lens 4 | 2.969190 | (ASP) | 1.194 | Plastic | 1.514 | 56.8 | 1.77 |
| 9 | | −1.134960 | (ASP) | 0.401 | | | | |
| 10 | IR-filter | Plano | | 0.400 | Glass | 1.517 | 64.2 | — |
| 11 | | Plano | | 0.406 | | | | |
| 12 | Image | Plano | | — | | | | |

The reference wavelength (d-line) is 587.6 nm.

TABLE 8

Aspheric Coefficients

| Surface # | 1 | 2 | 3 | 4 |
|---|---|---|---|---|
| k = | −5.84791E+00 | −9.17395E−01 | −3.59662E−01 | −1.00000E+00 |
| A4 = | −1.61005E−03 | −4.03922E−02 | −4.74113E−03 | 2.13909E−02 |
| A6 = | 1.85230E−05 | −2.46450E−03 | 4.43449E−03 | −1.93990E−03 |
| A8 = | 3.25524E−07 | 1.73357E−03 | −3.04741E−04 | −2.68589E−04 |
| A10 = | −5.76104E−09 | −5.66766E−04 | −1.35792E−05 | 2.12823E−04 |

| Surface # | 6 | 7 | 8 | 9 |
|---|---|---|---|---|
| k = | 1.68094E+00 | −1.00000E+00 | −1.00000E+00 | −5.77810E−01 |
| A4 = | −2.66969E−03 | −8.16151E−02 | −1.49597E−01 | 1.98370E−01 |
| A6 = | 1.14775E−02 | −6.57381E−02 | 6.62732E−02 | −2.94581E−02 |
| A8 = | −1.07163E−02 | 7.46727E−02 | −1.27487E−01 | −3.09593E−02 |
| A10 = | 2.85559E−03 | −1.88749E−02 | 3.89862E−02 | 1.06840E−02 |

Figure 9:
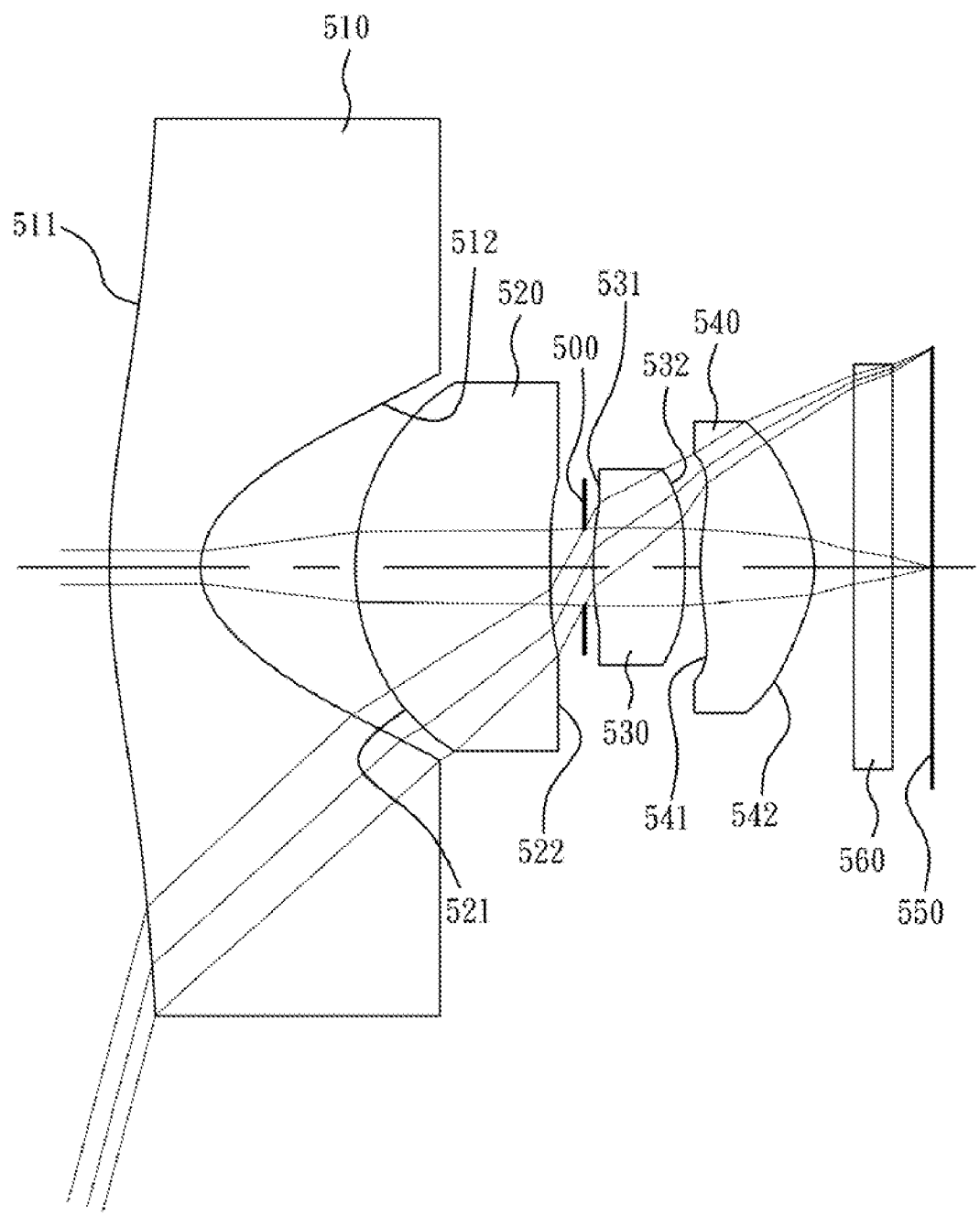
FIG. 9 is a schematic view of a wide-angle optical lens assembly according to the fifth embodiment.
Figure 10:
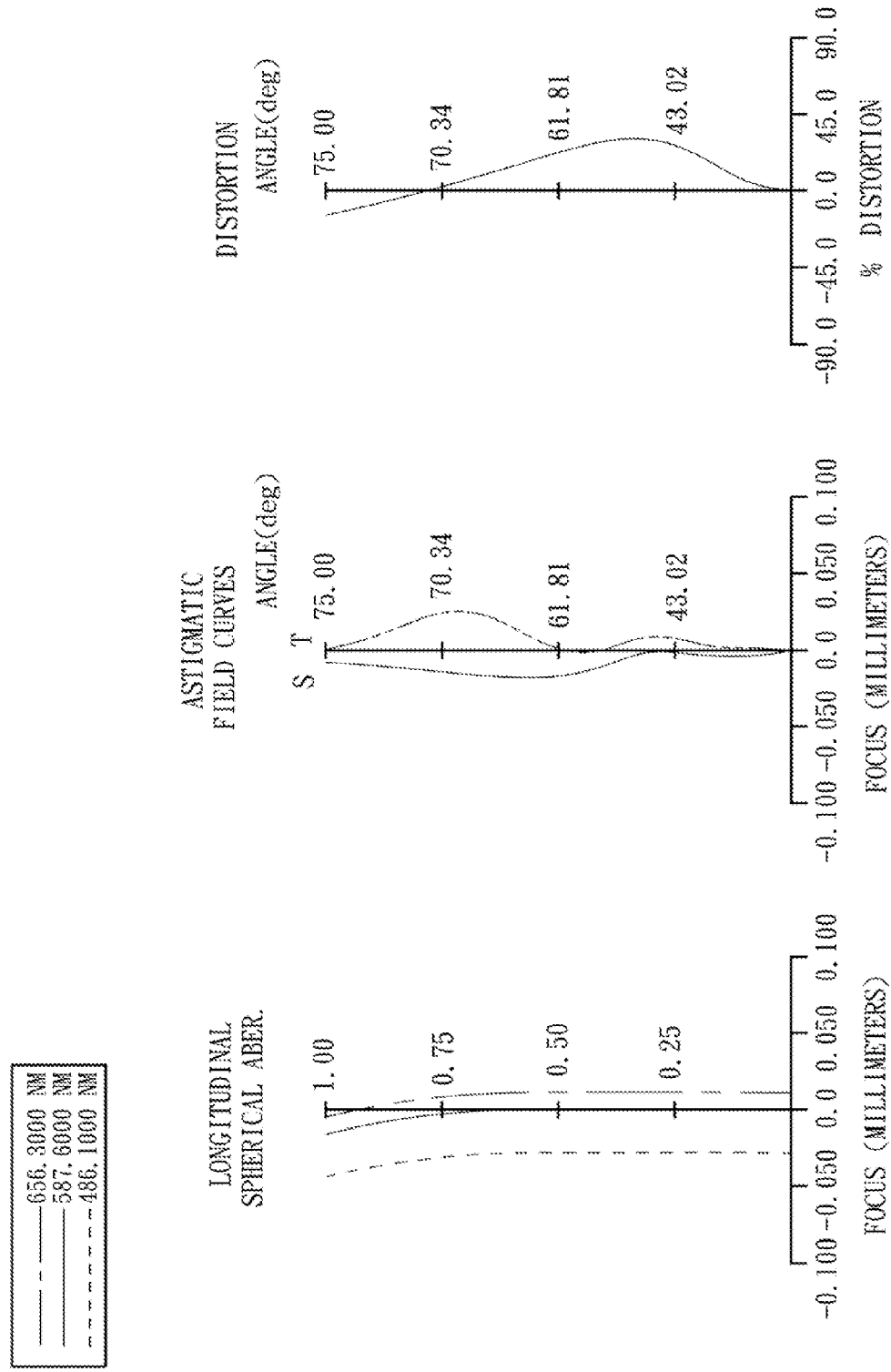
FIG. 10 shows spherical aberration curves, astigmatic field curves and distortion curve of the wide-angle optical lens assembly according to the fifth embodiment.

FIG. 9 is a schematic view of a wide-angle optical lens assembly according to the fifth embodiment. FIG. 10 shows spherical aberration curves, astigmatic field curves and distortion curve of the wide-angle optical lens assembly according to the fifth embodiment. In FIG. 9, the wide-angle optical lens assembly includes, in order from an object side to an image side: the first lens element 510, the second lens element 520, an aperture stop 500, the third lens element 530, the fourth lens element 540, an IR (infrared) cut filter 560 and an image plane 550.

The first lens element 510 is made of plastic material. The first lens element 510 with a negative refractive power has a convex object-side surface 511 and a concave image-side surface 512. The object-side surface 511 and the image-side surface 512 of the first lens element 510 are aspheric.

The second lens element 520 is made of plastic material. The second lens element 520 with a positive refractive power has a convex object-side surface 521 and a concave image-side surface 522. The object-side surface 521 and the image-side surface 522 of the second lens element 520 are aspheric.

The third lens element 530 is made of plastic material. The third lens element 530 with a positive refractive power has a convex object-side surface 531 and a convex image-side surface 532. The object-side surface 531 and the image-side surface 532 of the third lens element 530 are aspheric.

The fourth lens element 540 is made of plastic material. The fourth lens element 540 with a positive refractive power has a convex object-side surface 541 and a convex image-side surface 542. The object-side surface 541 and the image-side surface 542 of the fourth lens element 540 are aspheric.

The IR cut filter 560 is made of glass and is located between the fourth lens element 540 and the image plane 550 with no influence on the focal length of the wide-angle optical lens assembly.

The equation of the aspheric surface profiles of the above lens elements of the fifth embodiment is the same as that of the first embodiment, and will not be stated herein again.

In the wide-angle optical lens assembly according to the fifth embodiment, the definitions of f, Fno, HFOV, V1, V2, R2, R3, R4, R6, R7, CT1, CT4, T12, f2, f3, SAG11, SAG12, ImgH, SL and TTL are the same as those stated in the first embodiment with corresponding values for the fifth embodiment, and they satisfy the following relationships:

| f(mm) | 0.71 | (R3 + R4)/(R3 − R4) | −1.43 |
|---|---|---|---|
| Fno | 2.00 | \|R6 − R7\|/f | 10.84 |
| HFOV(degrees) | 75.0 | f/f2 | 0.175 |
| V1-V2 | 34.4 | f/f3 | 0.161 |
| R2/CT1 | 0.74 | \|SAG11/SAG12\| | 0.19 |
| CT4/CT1 | 1.25 | f/ImgH | 0.31 |
| T12/f | 2.24 | SL/TTL | 0.41 |

The detailed optical data of the fifth embodiment is shown in Table 9, and the aspheric surface data is shown in Table 10 as follows.

TABLE 9

5th Embodiment
f = 0.71 mm, Fno = 2.00, HFOV = 75.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 7.112800 (ASP) | 0.930 | Plastic | 1.530 | 55.8 | −1.52 |
| 2 | | 0.691070 (ASP) | 1.582 | | | | |
| 3 | Lens 2 | 2.315380 (ASP) | 1.992 | Plastic | 1.650 | 21.4 | 4.04 |
| 4 | | 13.022200 (ASP) | 0.350 | | | | |
| 5 | Ape. Stop | Plano | 0.092 | | | | |
| 6 | Lens 3 | 3.753900 (ASP) | 0.934 | Plastic | 1.514 | 56.8 | 4.40 |
| 7 | | −5.189500 (ASP) | 0.157 | | | | |
| 8 | Lens 4 | 2.506290 (ASP) | 1.165 | Plastic | 1.514 | 56.8 | 1.72 |
| 9 | | −1.153820 (ASP) | 0.401 | | | | |
| 10 | IR-filter | Plano | 0.400 | Glass | 1.517 | 64.2 | — |
| 11 | | Plano | 0.403 | | | | |
| 12 | Image | Plano | — | | | | |

The reference wavelength (d-line) is 587.6 nm.

TABLE 10

Aspheric Coefficients

| Surface # | 1 | 2 | 3 | 4 |
|---|---|---|---|---|
| k = | −1.78387E+01 | −9.13344E−01 | −9.71656E−01 | −1.00000E+00 |
| A4 = | −1.29046E−03 | −5.25002E−02 | 4.16563E−03 | 7.33230E−02 |
| A6 = | 2.71881E−05 | −3.87011E−03 | 4.22049E−03 | −6.46450E−03 |
| A8 = | 3.46633E−07 | 1.34614E−03 | −7.24911E−05 | −1.60199E−03 |
| A10 = | −1.30291E−08 | −5.68714E−04 | 3.51896E−05 | 1.55698E−02 |

| Surface # | 6 | 7 | 8 | 9 |
|---|---|---|---|---|
| k = | 1.74560E+00 | −1.00000E+00 | −1.00000E+00 | −5.58748E−01 |
| A4 = | −2.93881E−03 | −1.44845E−01 | −1.71334E−01 | 2.08024E−01 |
| A6 = | 1.35619E−02 | −3.47571E−02 | 9.30001E−02 | −2.49510E−02 |
| A8 = | −1.13457E−02 | 6.01209E−02 | −1.04509E−01 | −2.93697E−02 |
| A10 = | 3.62561E−03 | −1.15071E−02 | 2.27174E−02 | 9.77848E−03 |

Figure 11:
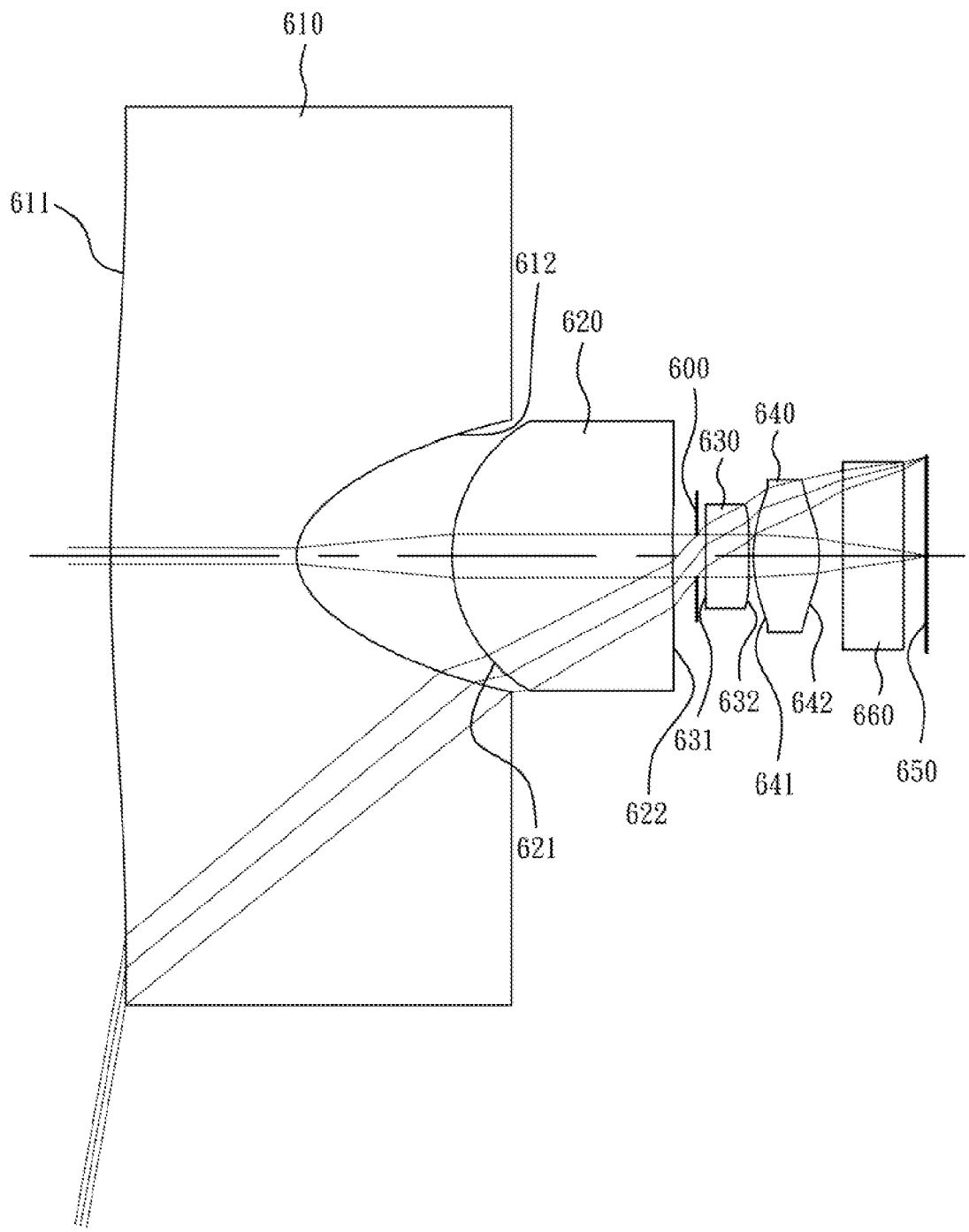
FIG. 11 is a schematic view of a wide-angle optical lens assembly according to the sixth embodiment.
Figure 12:
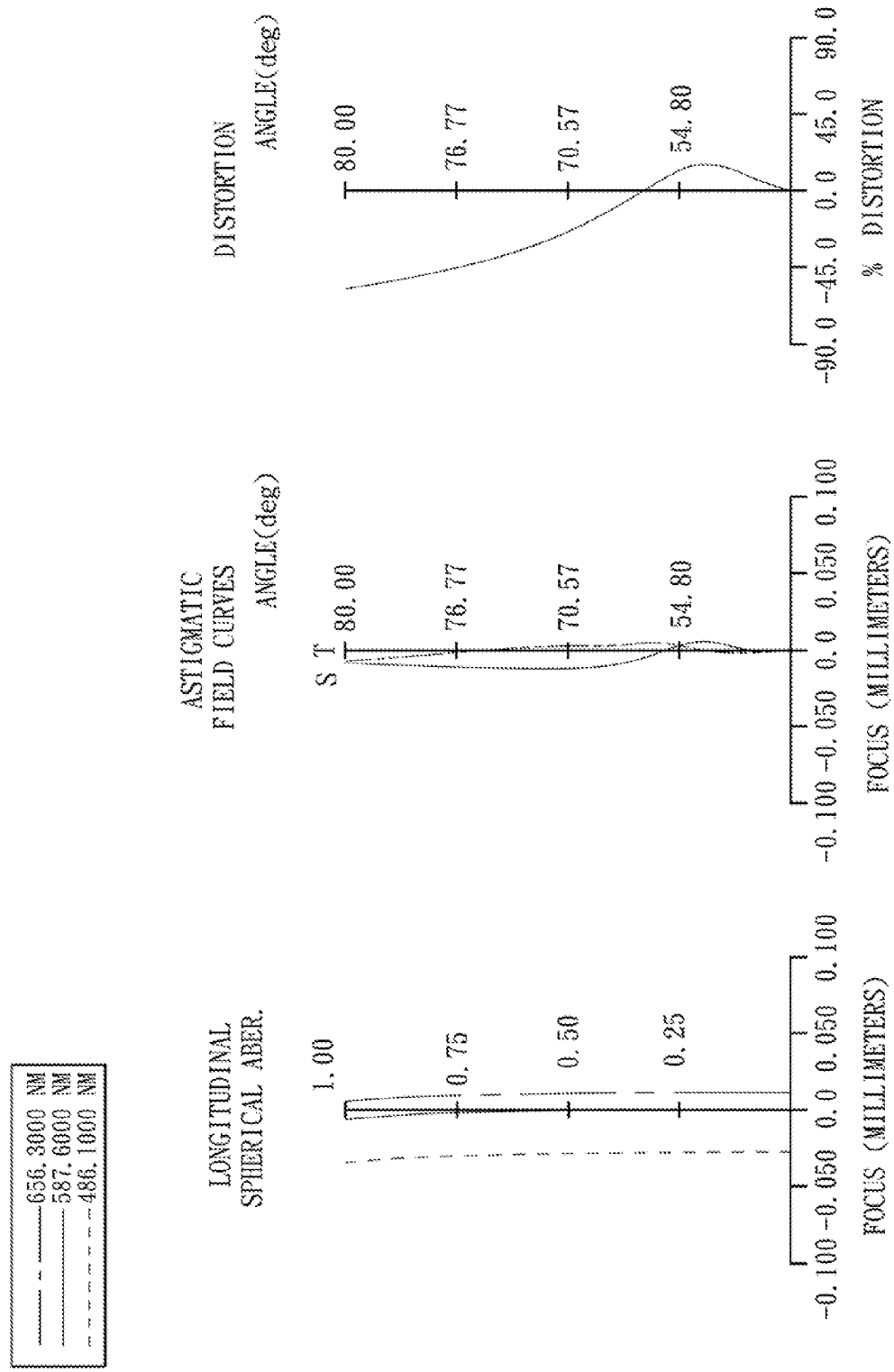
FIG. 12 shows spherical aberration curves, astigmatic field curves and distortion curve of the wide-angle optical lens assembly according to the sixth embodiment.

FIG. 11 is a schematic view of a wide-angle optical lens assembly according to the sixth embodiment. FIG. 12 shows spherical aberration curves, astigmatic field curves and distortion curve of the wide-angle optical lens assembly according to the sixth embodiment. In FIG. 11, the wide-angle optical lens assembly includes, in order from an object side to an image side: the first lens element 610, the second lens element 620, an aperture stop 600, the third lens element 630, the fourth lens element 640, an IR (infrared) cut filter 660 and to an image plane 650.

The first lens element 610 is made of plastic material. The first lens element 610 with a negative refractive power has a convex object-side surface 611 and a concave image-side surface 612. The object-side surface 611 and the image-side surface 612 of the first lens element 610 are aspheric.

The second lens element 620 is made of plastic material. The second lens element 620 with a positive refractive power has a convex object-side surface 621 and a convex image-side surface 622. The object-side surface 621 and the image-side surface 622 of the second lens element 620 are aspheric.

The third lens element 630 is made of plastic material. The third lens element 630 with a negative refractive power has a concave object-side surface 631 and a concave image-side surface 632. The object-side surface 631 and the image-side surface 632 of the third lens element 630 are aspheric.

The fourth lens element 640 is made of plastic material. The fourth lens element 640 with a positive refractive power has a convex object-side surface 641 and a convex image-side surface 642. The object-side surface 641 and the image-side surface 642 of the fourth lens element 640 are aspheric.

The IR cut filter 660 is made of glass and is located between the fourth lens element 640 and the image plane 650 with no influence on the focal length of the wide-angle optical lens assembly.

The equation of the aspheric surface profiles of the above lens elements of the sixth embodiment is the same as that of the first embodiment, and will not be stated herein again.

In the wide-angle optical lens assembly according to the sixth embodiment, the definitions of f, Fno, HFOV, V1, V2, R2, R3, R4, R6, R7, CT1, CT4, T12, f2, f3, SAG11, SAG12, ImgH, SL and TTL are the same as those stated in the first embodiment with corresponding values for the sixth embodiment, and they satisfy the following relationships:

| f(mm) | 0.49 | (R3 + R4)/(R3 − R4) | −0.89 |
|---|---|---|---|
| Fno | 2.60 | \|R6 − R7\|/f | 461.00 |
| HFOV(degrees) | 80.0 | f/f2 | 0.178 |
| V1−V2 | 32.7 | f/f3 | −0.002 |
| R2/CT1 | 0.26 | \|SAG11/SAG12\| | 0.07 |
| CT4/CT1 | 0.36 | f/ImgH | 0.42 |
| T12/f | 3.70 | SL/TTL | 0.26 |

The detailed optical data of the sixth embodiment is shown in Table 11, and the aspheric surface data is shown in Table 12 as follows.

TABLE 11

6th Embodiment
f = 0.49 mm, Fno = 2.60, HFOV = 80.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 24.090000 | (ASP) | 2.150 | Plastic | 1.543 | 56.5 | −1.07 |
| 2 | | 0.550120 | (ASP) | 1.798 | | | | |
| 3 | Lens 2 | 1.773200 | (ASP) | 2.557 | Plastic | 1.634 | 23.8 | 2.73 |
| 4 | | −31.826700 | (ASP) | 0.279 | | | | |
| 5 | Ape. Stop | Plano | | 0.101 | | | | |
| 6 | Lens 3 | −563.250300 | (ASP) | 0.500 | Plastic | 1.583 | 30.2 | −277.60 |
| 7 | | 227.387300 | (ASP) | 0.050 | | | | |
| 8 | Lens 4 | 1.498520 | (ASP) | 0.765 | Plastic | 1.544 | 55.9 | 1.28 |
| 9 | | −1.068740 | (ASP) | 0.273 | | | | |
| 10 | IR-filter | Plano | | 0.700 | Glass | 1.517 | 64.2 | — |
| 11 | | Plano | | 0.272 | | | | |
| 12 | Image | Plano | | — | | | | |

The reference wavelength (d-line) is 587.6 nm.

TABLE 12

Aspheric Coefficients

| Surface # | 1 | 2 | 3 | 4 |
|---|---|---|---|---|
| k = | 5.96032E+00 | −9.21045E−01 | −1.29992E−02 | −4.01709E+02 |
| A4 = | −8.41174E−04 | −1.09244E−01 | −1.56519E−02 | 1.22624E−01 |

TABLE 12-continued

Aspheric Coefficients

| A6 = | 8.05109E−06 | 1.59683E−02 | 4.97525E−03 | −1.46459E−01 |
|---|---|---|---|---|
| A8 = | 4.43143E−08 | 2.92554E−03 | 9.53285E−04 | 2.06574E−01 |
| A10 = | −7.48853E−10 | −1.39590E−04 | −3.31190E−04 | |

| Surface # | 6 | 7 | 8 | 9 |
|---|---|---|---|---|
| k = | 0.00000E+00 | −1.91602E+04 | 0.00000E+00 | 0.00000E+00 |
| A4 = | −7.31884E−02 | −2.89925E−01 | −1.88957E−01 | 4.29897E−01 |
| A6 = | −4.84289E−01 | −1.60077E−01 | 1.09666E−01 | 5.07014E−02 |
| A8 = | 3.15253E+00 | 1.38228E−01 | 6.32483E−03 | −8.03101E−02 |
| A10 = | | 1.66493E−02 | −1.38130E−01 | 2.42884E−02 |

In Table 11, the curvature radius, the thickness and the focal length are shown in millimeters (mm). Surface numbers 0-12 represent the surfaces sequentially arranged from the object-side to the image-side along the optical axis. In Table 12, k represents the conic coefficient of the equation of the aspheric surface profiles. A1-A10 represent the aspheric coefficients ranging from the 1st order to the 10th.

Figure 13:
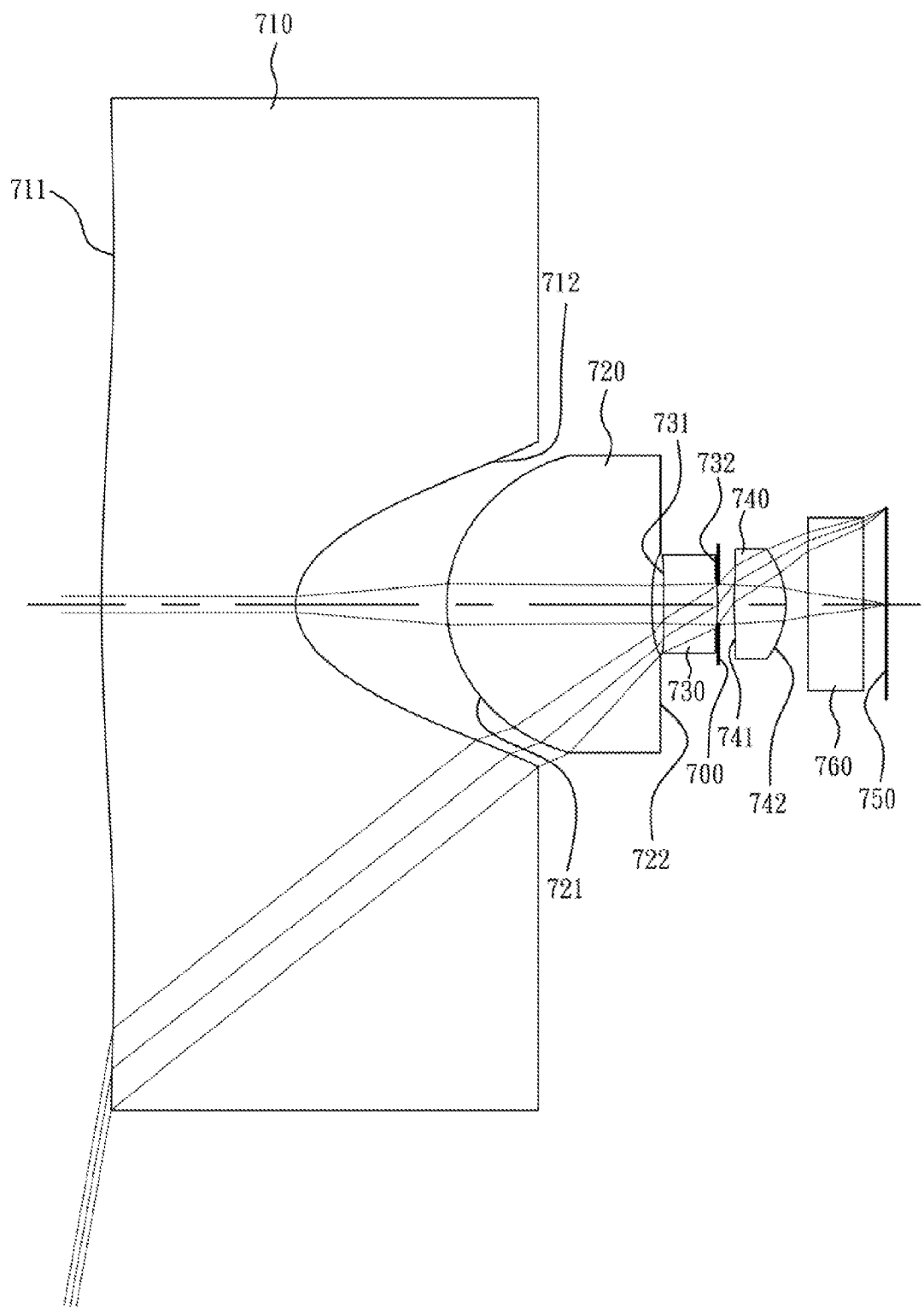
FIG. 13 is a schematic view of a wide-angle optical lens assembly according to the seventh embodiment.
Figure 14:
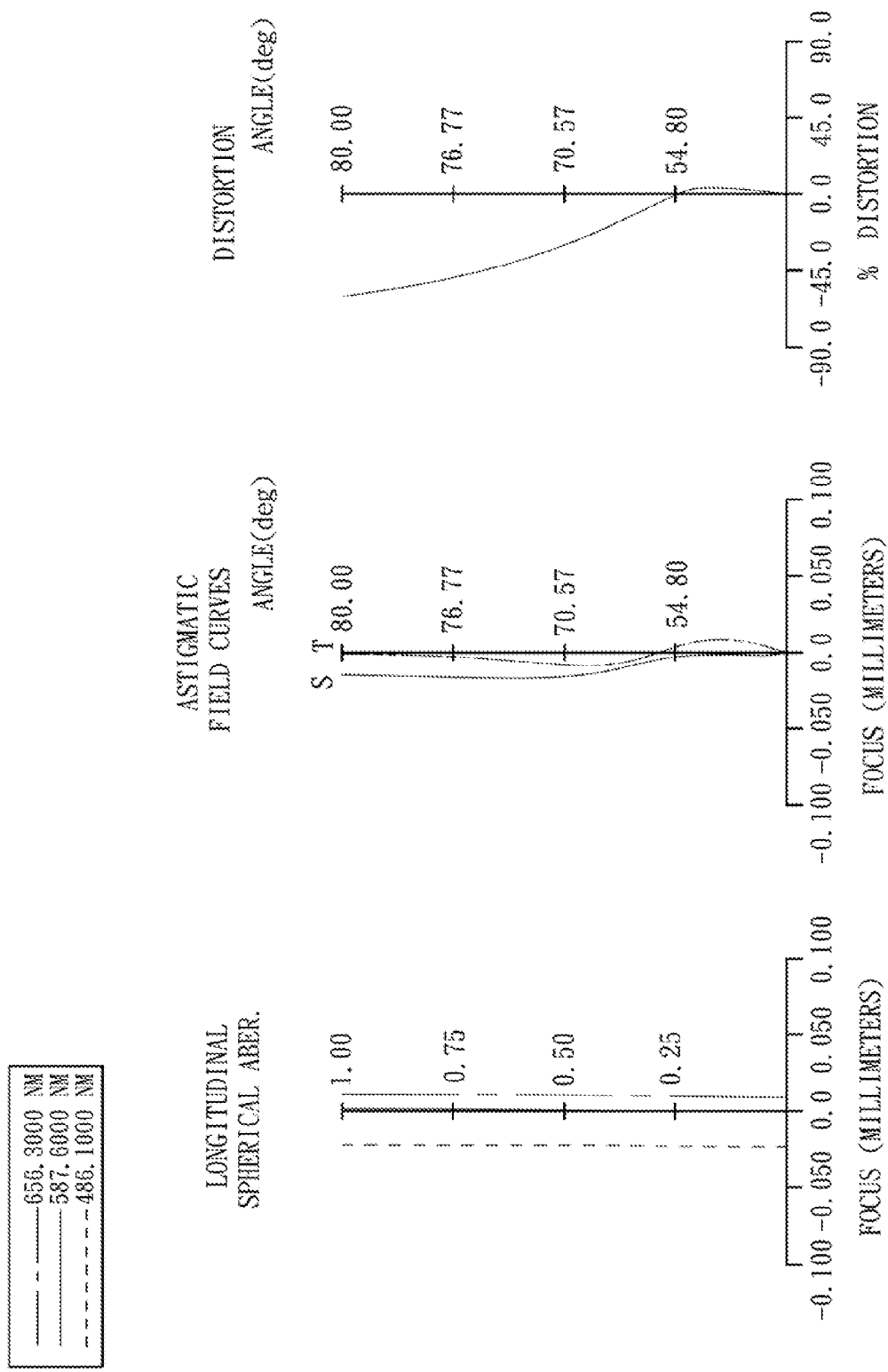
FIG. 14 shows spherical aberration curves, astigmatic field curves and distortion curve of the wide-angle optical lens assembly according to the seventh embodiment.

FIG. 13 is a schematic view of a wide-angle optical lens assembly according to the seventh embodiment. FIG. 14 shows spherical aberration curves, astigmatic field curves and distortion curve of the wide-angle optical to lens assembly according to the seventh embodiment. In FIG. 13, the wide-angle optical lens assembly includes, in order from an object side to an image side: the first lens element 710, the second lens element 720, the third lens element 730, an aperture stop 700, the fourth lens element 740, an IR (infrared) cut filter 760 and an image plane 750.

The first lens element 710 is made of plastic material. The first lens element 710 with a negative refractive power has a convex object-side surface 711 and a concave image-side surface 712. The object-side surface 711 and the image-side surface 712 of the first lens element 710 are aspheric.

The second lens element 720 is made of plastic material. The second lens element 720 with a positive refractive power has a convex object-side surface 721 and a concave image-side surface 722. The object-side surface 721 and the image-side surface 722 of the second lens element 720 are aspheric.

The third lens element 730 is made of plastic material. The third lens element 730 with a positive refractive power has a convex object-side surface 731 and a convex image-side surface 732. The object-side surface 731 and the image-side surface 732 of the third lens element 730 are aspheric.

The fourth lens element 740 is made of plastic material. The fourth lens element 740 with a positive refractive power has a convex object-side surface 741 and a convex image-side surface 742. The object-side surface 741 and the image-side surface 742 of the fourth lens element 740 are aspheric.

The IR cut filter 760 is made of glass and is located between the fourth lens element 740 and the image plane 750 with no influence on the focal length of the wide-angle optical lens assembly.

The equation of the aspheric surface profiles of the above lens elements of the seventh embodiment is the same as that of the first embodiment, and will not be stated herein again.

In the wide-angle optical lens assembly according to the seventh embodiment, the definitions of f, Fno, HFOV, V1, V2, R2, R3, R4, R6, R7, CT1, CT4, T12, f2, f3, SAG11, SAG12, ImgH, SL and TTL are the same as those stated in the first embodiment with corresponding values for the seventh embodiment, and they satisfy the following relationships:

| f(mm) | 0.54 | (R3 + R4)/(R3 − R4) | −2.48 |
|---|---|---|---|
| Fno | 2.60 | \|R6 − R7\|/f | 9.76 |
| HFOV(degrees) | 80.0 | f/f2 | 0.156 |
| V1-V2 | 32.7 | f/f3 | 0.179 |
| R2/CT1 | 0.27 | \|SAG11/SAG12\| | 0.04 |
| CT4/CT1 | 0.27 | f/ImgH | 0.45 |
| T12/f | 3.52 | SL/TTL | 0.20 |

The detailed optical data of the seventh embodiment is shown in Table 13, and the aspheric surface data is shown in Table 14 as follows.

TABLE 13

7th Embodiment
f = 0.54 mm, Fno = 2.60, HFOV = 80.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 26.123000 (ASP) | 2.451 | Plastic | 1.543 | 56.5 | −1.31 |
| 2 | | 0.672500 (ASP) | 1.911 | | | | |
| 3 | Lens 2 | 1.796880 (ASP) | 2.592 | Plastic | 1.634 | 23.8 | 3.49 |
| 4 | | 4.219100 (ASP) | 0.148 | | | | |
| 5 | Lens 3 | 25.094200 (ASP) | 0.686 | Plastic | 1.514 | 56.8 | 3.01 |
| 6 | | −1.631530 (ASP) | 0.002 | | | | |
| 7 | Ape. Stop | Plano | 0.202 | | | | |
| 8 | Lens 4 | 3.637600 (ASP) | 0.653 | Plastic | 1.514 | 56.8 | 1.62 |
| 9 | | −1.016830 (ASP) | 0.283 | | | | |
| 10 | IR-filter | Plano | 0.700 | Glass | 1.517 | 64.2 | — |
| 11 | | Plano | 0.287 | | | | |
| 12 | Image | Plano | — | | | | |

The reference wavelength (d-line) is 587.6 nm.

TABLE 14

Aspheric Coefficients

| Surface # | 1 | 2 | 3 | 4 |
|---|---|---|---|---|
| k = | 6.72962E+00 | −9.21576E−01 | −1.54291E−01 | 3.95465E+01 |
| A4 = | −8.06756E−04 | 6.67318E−03 | 3.93636E−03 | 1.72763E−01 |
| A6 = | 8.30786E−06 | −1.40909E−02 | −1.09593E−03 | −2.19001E−01 |
| A8 = | 4.07527E−08 | 1.73873E−03 | 4.03086E−04 | 5.04804E−01 |
| A10 = | −1.02947E−09 | −5.12654E−04 | −7.83518E−05 | |

TABLE 14-continued

Aspheric Coefficients

| Surface # | 5 | 6 | 8 | 9 |
|---|---|---|---|---|
| k = | 0.00000E+00 | 9.50659E−01 | 0.00000E+00 | 0.00000E+00 |
| A4 = | −1.45419E−01 | −2.29613E−01 | −2.46907E−01 | 1.77563E−01 |
| A6 = | −1.77245E−02 | 3.22294E−03 | −6.57568E−02 | −4.09523E−02 |
| A8 = | −2.27860E−01 | 6.20637E−01 | −2.75238E−01 | −1.07186E−01 |
| A10 = | | 1.88804E+00 | −1.44056E−01 | −6.19004E−02 |

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wide-angle optical lens assembly comprising, in order from an object side to an image side:
   a first lens element with a negative refractive power having a concave image-side surface;
   a second lens element with a positive refractive power;
   a third lens element with a positive refractive power; and
   a fourth lens element with a positive refractive power having a convex image-side surface, wherein at least one surface of the fourth lens element is aspheric, and the fourth lens element is made of plastic material;
   wherein a radius of curvature of the image-side surface of the first lens element is R2, a radius of curvature of the object-side surface of the second lens element is R3, a radius of curvature of the image-side surface of the is second lens element is R4, a thickness on the optical axis of the first lens element is CT1, a thickness on the optical axis of the fourth lens element is CT4, and they satisfy the following relationships:

$0.0 < R2/CT1 < 5.0;$ $-3.5 < (R3+R4)/(R3-R4) < 0.0;$ and $0.0 < CT4/CT1 < 1.5.$ 2. The wide-angle optical lens assembly of claim 1, wherein at least one surface of the first lens element is aspheric.

3. The wide-angle optical lens assembly of claim 2, further comprising:
an aperture stop, wherein a distance on the optical axis between the aperture stop and an image plane is SL, a distance on the optical axis between the object-side surface of the first lens element and the image plane is TTL, and they satisfy the following relationship:

$0.1 < SL/TTL < 0.7$.

4. The wide-angle optical lens assembly of claim 3, wherein the radius of curvature of the image-side surface of the first lens element is R2, the thickness on the optical axis of the first lens element is CT1, and they satisfy the following relationship:

$0.0 < R2/CT1 < 2.0$.

5. The wide-angle optical lens assembly of claim 4, wherein the radius of curvature of the image-side surface of the first lens element is R2, the thickness on the optical axis of the first lens element is CT1, and they satisfy the following relationship:

$0.0 < R2/CT1 < 0.8$.

6. The wide-angle optical lens assembly of claim 4, wherein the Abbe number of the first lens element is V1, the Abbe number of the second lens element is V2, and they satisfy the following relationship:

$28 < V1 - V2 < 42$.

7. The wide-angle optical lens assembly of claim 6, wherein the thickness on the optical axis of the first lens element is CT1, the thickness on the optical axis of the fourth lens element is CT4, and they satisfy the following relationship:

$0.0 < CT4/CT1 < 0.8$.

8. The wide-angle optical lens assembly of claim 3, wherein a focal length of the wide-angle optical lens assembly is f, a focal length of the second lens element is f2, and they satisfy the following relationship:

$0.0 < f/f2 < 0.8$.

9. The wide-angle optical lens assembly of claim 8, wherein the radius of curvature of the object-side surface of the second lens element is R3, the radius of curvature of the image-side surface of the second lens element is R4, and they satisfy the following relationship:

$-2.5 < (R3+R4)/(R3-R4) < -0.8$.

10. The wide-angle optical lens assembly of claim 9, further comprising:
an image sensor located on the image plane, wherein a half of a diagonal length of an effective photosensitive area of the image sensor is ImgH, and the focal length of the wide-angle optical lens assembly is f, and they satisfy the following relationship:

$0.2 < f/ImgH < 0.6$.

11. The wide-angle optical lens assembly of claim 5, wherein a distance on the optical axis between the first lens element and the second lens element is T12, the focal length of the wide-angle optical lens assembly is f, and they satisfy the following relationship:

$1.3 < T12/f < 3.5$.

12. The wide-angle optical lens assembly of claim 11, wherein the horizontal distance between the position of the maximum range of the incident light passing through the object-side surface of the first lens element and the intersection point of the optical axis and the object-side surface of the first lens element is SAG11, and the horizontal distance between the position of the maximum range of the incident light passing through the image-side surface of the first lens element and the intersection point of the optical axis and the image-side surface of the first lens element is SAG12, and they satisfy the following relationship:

$|SAG11/SAG12| < 0.25$.

13. The wide-angle optical lens assembly of claim 4, wherein the fourth lens element has at least one inflection point on at least one of the object-side surface and the image-side surface.

14. A wide-angle optical lens assembly comprising, in order from an object side to an image side:
a first lens element with a negative refractive power having a concave image-side surface;
a second lens element with a positive refractive power having a convex object-side surface;
a third lens element; and
a fourth lens element with a positive refractive power having a convex image-side surface, wherein at least one surface of the fourth lens element is aspheric, and the fourth lens element is made of plastic material;
wherein a radius of curvature of the image-side surface of the first lens element is R2, a thickness on the optical axis of the first lens element is CT1, a focal length of the wide-angle optical lens assembly is f, a focal length of the second lens element is f2, a distance on the optical axis between the first lens element and the second lens element is T12, a radius of curvature of the image-side surface of the third lens element is R6, a radius of curvature of the object-side surface of the fourth lens element is R7, and they satisfy the following relationships:

$0.0 < R2/CT1 < 2.0$;

$0.0 < f/f2 < 0.8$;

$0.8 < T12/f < 5.0$;

and $1.0 < |R6-R7|/f$.

15. The wide-angle optical lens assembly of claim 14, wherein the radius of curvature of the image-side surface of the first lens element is R2, the thickness on the optical axis of the first lens element is CT1, and they satisfy the following relationship:

$0.0 < R2/CT1 < 0.8$.

16. The wide-angle optical lens assembly of claim 14, further comprising:
an aperture stop, wherein a distance on the optical axis between the aperture stop and an image plane is SL, a distance on the optical axis between the object-side surface of the first lens element and the image plane is TTL, and they satisfy the following relationship:

$0.1 < SL/TTL < 0.7$.

17. The wide-angle optical lens assembly of claim 16, wherein the focal length of the wide-angle optical lens assembly is f, the focal length of the second lens element is f2, and they satisfy the following relationship:

$0.0 < f/f2 < 0.5$.

18. The wide-angle optical lens assembly of claim 17, further comprising:

an image sensor located on the image plane, wherein a half of a diagonal length of an effective photosensitive area of the image sensor is ImgH, and the focal length of the wide-angle optical lens assembly is f, and they satisfy the following relationship:

$0.2 < f/ImgH < 0.6$.

19. The wide-angle optical lens assembly of claim 17, wherein a radius of curvature of the object-side surface of the second lens element is R3, and a radius of curvature of the image-side surface of the second lens element is R4, and R3 and R4 satisfy the following relationship:

$-2.5 < (R3+R4)/(R3-R4) < -0.8$.

20. The wide-angle optical lens assembly of claim 17, wherein the thickness on the optical axis of the first lens element is CT1, a thickness on the optical axis of the fourth lens element is CT4, and they satisfy the following relationship:

$0.0 < CT4/CT1 < 0.8$.

21. The wide-angle optical lens assembly of claim 17, wherein the fourth lens element has at least one inflection point on at least one of the object-side surface and the image-side surface.

22. The wide-angle optical lens assembly of claim 17, wherein the focal length of the wide-angle optical lens assembly is f, a focal length of the third lens element is f3, and they satisfy the following relationship:

$-0.1 < f/f3 < 0.3$.

* * * * *